US012299638B2

(12) United States Patent
Beauchamp et al.

(10) Patent No.: US 12,299,638 B2
(45) Date of Patent: *May 13, 2025

(54) SYSTEMS AND METHODS TO FACILITATE INTERACTION WITH A COLLABORATION ENVIRONMENT BASED ON ASSIGNMENT OF PROJECT-LEVEL ROLES

(71) Applicant: Asana, Inc., San Francisco, CA (US)

(72) Inventors: Tyler Jeffrey Beauchamp, Bismarck, ND (US); Micah Hanan Fenner, San Francisco, CA (US); Reyana Fayyaz, San Francisco, CA (US); Jocelyn Karlan Newman, San Francisco, CA (US)

(73) Assignee: Asana, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/308,959

(22) Filed: Apr. 28, 2023

(65) Prior Publication Data

US 2023/0267419 A1 Aug. 24, 2023

Related U.S. Application Data

(63) Continuation of application No. 17/230,151, filed on Apr. 14, 2021, now Pat. No. 11,676,107.

(51) Int. Cl.
*G06Q 10/10* (2023.01)
(52) U.S. Cl.
CPC .................. *G06Q 10/103* (2013.01)
(58) Field of Classification Search
None
See application file for complete search history.

(56) References Cited

U.S. PATENT DOCUMENTS 5,233,687 A 8/1993 Henderson, Jr.
5,524,077 A 6/1996 Faaland
(Continued)

FOREIGN PATENT DOCUMENTS

CN 101305350 A 11/2008
CN 101563671 A 10/2009
(Continued)

OTHER PUBLICATIONS

Tsung-Yi Chen, Yuh-Min Chen, Hui-Chuan Chu, Developing a trust evaluation method between co-workers in virtual project team for enabling resource sharing and collaboration, Computers in Industry, vol. 59, Issue 6. (Year: 2008) 15 pages.

(Continued)

*Primary Examiner* — Sarah M Monfeldt
*Assistant Examiner* — Donald J Edmonds
(74) *Attorney, Agent, or Firm* — Esplin & Associates, PC

(57) ABSTRACT

Systems and methods to facilitate interaction with a collaboration environment based on assignment of project-level roles are described herein. Exemplary implementations may: manage environment state information maintaining a collaboration environment; obtain role information specifying roles of the users within units of work and projects; update the environment state information based on the role information; effectuate presentation of the collaboration environment based on the environment state information so that access, by the users, to the individual units of work and the individual projects reflects the roles of the users within the units of work and the projects; and/or perform other operations.

20 Claims, 3 Drawing Sheets

(56) References Cited

U.S. PATENT DOCUMENTS

| | | |
|---|---|---|
| 5,530,861 A | 6/1996 | Diamant |
| 5,548,506 A | 8/1996 | Srinivasan |
| 5,608,898 A | 3/1997 | Turpin |
| 5,611,076 A | 3/1997 | Durflinger |
| 5,623,404 A | 4/1997 | Collins |
| 5,721,770 A | 2/1998 | Kohler |
| 5,983,277 A | 11/1999 | Heile |
| 6,024,093 A | 2/2000 | Cron |
| 6,256,651 B1 | 7/2001 | Tuli |
| 6,292,830 B1 | 9/2001 | Taylor |
| 6,332,147 B1 | 12/2001 | Moran |
| 6,385,639 B1 | 5/2002 | Togawa |
| 6,578,004 B1 | 6/2003 | Cimral |
| 6,621,505 B1 | 9/2003 | Beauchamp |
| 6,629,081 B1 | 9/2003 | Cornelius |
| 6,769,013 B2 | 7/2004 | Frees |
| 6,859,523 B1 | 2/2005 | Jilk |
| 7,020,697 B1 | 3/2006 | Goodman |
| 7,039,596 B1 | 5/2006 | Lu |
| 7,086,062 B1 | 8/2006 | Faour |
| 7,349,920 B1 | 3/2008 | Feinberg |
| 7,418,482 B1 | 8/2008 | Lusher |
| 7,428,723 B2 | 9/2008 | Greene |
| 7,613,688 B2 | 11/2009 | Wiest |
| 7,640,511 B1 | 12/2009 | Keel |
| 7,676,542 B2 | 3/2010 | Moser |
| 7,779,039 B2 | 8/2010 | Weissman |
| 7,805,327 B1 | 9/2010 | Schulz |
| RE41,848 E | 10/2010 | Daniell |
| 7,917,855 B1 | 3/2011 | Satish |
| 7,991,632 B1 | 8/2011 | Morris |
| 7,996,744 B2 | 8/2011 | Ojala |
| 7,996,774 B1 | 8/2011 | Sidenur |
| 8,214,747 B1 | 7/2012 | Yankovich |
| 8,314,809 B1 | 11/2012 | Grabowski |
| 8,352,310 B1 | 1/2013 | Bessler |
| 8,365,065 B2 | 1/2013 | Gejdos |
| 8,499,300 B2 | 7/2013 | Zimberg |
| 8,522,240 B1 | 8/2013 | Merwarth |
| 8,527,287 B1 | 9/2013 | Bhatia |
| 8,531,447 B2 | 9/2013 | Walker |
| 8,554,832 B1 | 10/2013 | Moskovitz |
| 8,572,477 B1 | 10/2013 | Moskovitz |
| 8,583,579 B1 | 11/2013 | Seth |
| 8,627,199 B1 | 1/2014 | Handley |
| 8,639,552 B1 | 1/2014 | Chen |
| 8,768,751 B2 | 7/2014 | Jakowski |
| 8,831,879 B2 | 9/2014 | Stamm |
| 8,843,832 B2 | 9/2014 | Frields |
| 8,863,021 B1 | 10/2014 | Bee |
| 8,909,631 B1 | 12/2014 | Seth |
| 8,938,690 B1 | 1/2015 | Khouri |
| 9,009,096 B2 | 4/2015 | Pinckney |
| 9,024,752 B2 | 5/2015 | Tumayan |
| 9,122,834 B1 | 9/2015 | Caluya |
| 9,143,839 B2 | 9/2015 | Reisman |
| 9,152,668 B1 | 10/2015 | Moskovitz |
| 9,189,756 B2 | 11/2015 | Gilbert |
| 9,201,952 B1 | 12/2015 | Chau |
| 9,208,262 B2 | 12/2015 | Bechtel |
| 9,251,484 B2 | 2/2016 | Cantor |
| 9,350,560 B2 | 5/2016 | Hupfer |
| 9,372,596 B2 | 6/2016 | Breedvelt-Schouten |
| 9,383,917 B2 | 7/2016 | Mouton |
| 9,405,532 B1 | 8/2016 | Sullivan |
| 9,405,810 B2 | 8/2016 | Smith |
| 9,454,623 B1 | 9/2016 | Kaptsan |
| 9,514,424 B2 | 12/2016 | Kleinbart |
| 9,600,136 B1 | 3/2017 | Yang |
| 9,674,361 B2 | 6/2017 | Ristock |
| 9,712,576 B1 | 7/2017 | Gill |
| 9,785,445 B2 | 10/2017 | Mitsui |
| 9,830,398 B2 | 11/2017 | Schneider |
| 9,842,312 B1 | 12/2017 | Rosati |
| 9,949,681 B2 | 4/2018 | Badenes |
| 9,953,282 B2 | 4/2018 | Shaouy |
| 9,959,420 B2 | 5/2018 | Kiang |
| 9,978,040 B2 | 5/2018 | Lee |
| 9,990,636 B1 | 6/2018 | Lewis |
| 10,001,911 B2 | 6/2018 | Breedvelt-Schouten |
| 10,003,693 B2 | 6/2018 | Wolthuis |
| 10,083,412 B2 | 9/2018 | Suntinger |
| 10,157,355 B2 | 12/2018 | Johnson |
| 10,192,181 B2 | 1/2019 | Katkar |
| 10,235,156 B2 | 3/2019 | Johnson |
| 10,264,067 B2 | 4/2019 | Subramani |
| 10,308,992 B2 | 6/2019 | Chauvin |
| 10,373,084 B2 | 8/2019 | Kurjanowicz |
| 10,373,090 B2 | 8/2019 | Holm |
| 10,382,501 B2 | 8/2019 | Malatesha |
| 10,454,911 B2 | 10/2019 | Hanhirova |
| 10,455,011 B2 | 10/2019 | Kendall |
| 10,496,943 B2 | 12/2019 | De |
| 10,586,211 B2 | 3/2020 | Steplyk |
| 10,594,788 B2 | 3/2020 | Larabie-Belanger |
| 10,606,859 B2 | 3/2020 | Smith |
| 10,613,735 B1 | 4/2020 | Karpe |
| 10,614,404 B2 | 4/2020 | Guo |
| 10,616,151 B1 | 4/2020 | Cameron |
| 10,623,359 B1 | 4/2020 | Rosenstein |
| 10,671,692 B2 | 6/2020 | Koopman |
| 10,684,870 B1 | 6/2020 | Sabo |
| 10,706,484 B1 | 7/2020 | Murnock |
| 10,785,046 B1 | 9/2020 | Raghavan |
| 10,810,222 B2 | 10/2020 | Koch |
| 10,846,105 B2 | 11/2020 | Granot |
| 10,846,297 B2 | 11/2020 | Smith |
| 10,922,104 B2 | 2/2021 | Sabo |
| 10,956,845 B1 | 3/2021 | Sabo |
| 10,970,299 B2 | 4/2021 | Smith |
| 10,977,434 B2 | 4/2021 | Pelz |
| 10,983,685 B2 | 4/2021 | Karpe |
| 11,082,281 B2 | 8/2021 | Justin |
| 11,095,468 B1 | 8/2021 | Pandey |
| 11,113,667 B1 | 9/2021 | Jiang |
| 11,138,021 B1 | 10/2021 | Rosenstein |
| 11,140,174 B2 | 10/2021 | Patel |
| 11,204,683 B1 | 12/2021 | Sabo |
| 11,212,242 B2 | 12/2021 | Cameron |
| 11,263,228 B2 | 3/2022 | Koch |
| 11,288,081 B2 | 3/2022 | Sabo |
| 11,290,296 B2 | 3/2022 | Raghavan |
| 11,327,645 B2 | 5/2022 | Karpe |
| 11,341,444 B2 | 5/2022 | Sabo |
| 11,341,445 B1 | 5/2022 | Cheng |
| 11,443,281 B2 | 9/2022 | Culver |
| 11,500,620 B2 | 11/2022 | Scolnick |
| 11,501,063 B2 | 11/2022 | Norota |
| 11,657,306 B2 | 5/2023 | Aggarwal |
| 2002/0065798 A1 | 5/2002 | Bostleman |
| 2002/0082889 A1 | 6/2002 | Oliver |
| 2002/0143594 A1 | 10/2002 | Kroeger |
| 2003/0028595 A1 | 2/2003 | Vogt |
| 2003/0036934 A1 | 2/2003 | Ouchi |
| 2003/0041317 A1 | 2/2003 | Sokolov |
| 2003/0097406 A1 | 5/2003 | Stafford |
| 2003/0097410 A1 | 5/2003 | Atkins |
| 2003/0101086 A1 | 5/2003 | San Miguel |
| 2003/0106039 A1 | 6/2003 | Rosnow |
| 2003/0126001 A1 | 7/2003 | Northcutt |
| 2003/0200223 A1 | 10/2003 | Hack |
| 2003/0225598 A1 | 12/2003 | Yu |
| 2003/0233265 A1 | 12/2003 | Lee |
| 2003/0233268 A1 | 12/2003 | Taqbeem |
| 2004/0083448 A1 | 4/2004 | Schulz |
| 2004/0093290 A1 | 5/2004 | Doss |
| 2004/0093351 A1 | 5/2004 | Lee |
| 2004/0098291 A1 | 5/2004 | Newburn |
| 2004/0122693 A1 | 6/2004 | Hatscher |
| 2004/0125150 A1 | 7/2004 | Adcock |
| 2004/0162833 A1 | 8/2004 | Jones |
| 2004/0187089 A1 | 9/2004 | Schulz |
| 2004/0207249 A1 | 10/2004 | Baumgartner |
| 2004/0230447 A1 | 11/2004 | Schwerin-Wenzel |

(56) References Cited

U.S. PATENT DOCUMENTS

| | | |
|---|---|---|
| 2004/0233235 A1 | 11/2004 | Rubin |
| 2004/0268451 A1 | 12/2004 | Robbin |
| 2005/0027582 A1 | 2/2005 | Chereau |
| 2005/0210394 A1 | 9/2005 | Crandall |
| 2005/0216111 A1 | 9/2005 | Nobuhiro |
| 2005/0216830 A1 | 9/2005 | Turner |
| 2005/0222971 A1 | 10/2005 | Cary |
| 2005/0234886 A1 | 10/2005 | Mohraz |
| 2005/0262081 A1 | 11/2005 | Newman |
| 2006/0028917 A1 | 2/2006 | Wigginton |
| 2006/0047454 A1 | 3/2006 | Tamaki |
| 2006/0085245 A1 | 4/2006 | Takatsuka |
| 2006/0095859 A1 | 5/2006 | Bocking |
| 2006/0136441 A1 | 6/2006 | Fujisaki |
| 2006/0143270 A1 | 6/2006 | Wodtke |
| 2006/0167736 A1 | 7/2006 | Weiss |
| 2006/0190391 A1 | 8/2006 | Cullen, III |
| 2006/0200264 A1 | 9/2006 | Kodama |
| 2006/0218551 A1 | 9/2006 | Berstis |
| 2006/0224430 A1 | 10/2006 | Butt |
| 2006/0277487 A1 | 12/2006 | Poulsen |
| 2007/0016646 A1 | 1/2007 | Tendjoukian |
| 2007/0025567 A1 | 2/2007 | Fehr |
| 2007/0038494 A1 | 2/2007 | Kreitzberg |
| 2007/0041542 A1 | 2/2007 | Schramm |
| 2007/0050225 A1 | 3/2007 | Leslie |
| 2007/0073575 A1 | 3/2007 | Yomogida |
| 2007/0143169 A1 | 6/2007 | Grant |
| 2007/0147178 A1 | 6/2007 | Masuda |
| 2007/0150327 A1 | 6/2007 | Dromgold |
| 2007/0232278 A1 | 10/2007 | May |
| 2007/0239573 A1 | 10/2007 | Tien |
| 2007/0255674 A1 | 11/2007 | Mahoney |
| 2007/0255715 A1 | 11/2007 | Li |
| 2007/0260499 A1 | 11/2007 | Greef |
| 2007/0288283 A1 | 12/2007 | Fitzpatrick |
| 2007/0294344 A1 | 12/2007 | Mohan |
| 2008/0033777 A1 | 2/2008 | Shukoor |
| 2008/0033876 A1 | 2/2008 | Goldman |
| 2008/0034314 A1 | 2/2008 | Louch |
| 2008/0046471 A1 | 2/2008 | Moore |
| 2008/0079730 A1 | 4/2008 | Zhang |
| 2008/0082389 A1 | 4/2008 | Gura |
| 2008/0082956 A1 | 4/2008 | Gura |
| 2008/0091782 A1 | 4/2008 | Jakobson |
| 2008/0120129 A1 | 5/2008 | Seubert |
| 2008/0126930 A1 | 5/2008 | Scott |
| 2008/0133736 A1 | 6/2008 | Wensley |
| 2008/0134069 A1 | 6/2008 | Horvitz |
| 2008/0155547 A1 | 6/2008 | Weber |
| 2008/0158023 A1 | 7/2008 | Chung |
| 2008/0167937 A1 | 7/2008 | Coughlin |
| 2008/0175104 A1 | 7/2008 | Grieb |
| 2008/0195964 A1 | 8/2008 | Randell |
| 2008/0221946 A1 | 9/2008 | Balon |
| 2008/0222566 A1 | 9/2008 | Daughtrey |
| 2008/0244582 A1 | 10/2008 | Brown |
| 2008/0268876 A1 | 10/2008 | Gelfand |
| 2008/0270198 A1 | 10/2008 | Graves |
| 2008/0281665 A1 | 11/2008 | Opaluch |
| 2008/0313004 A1 | 12/2008 | Ryan |
| 2008/0313110 A1 | 12/2008 | Kreamer |
| 2009/0048986 A1 | 2/2009 | Anderson |
| 2009/0055796 A1 | 2/2009 | Springborn |
| 2009/0076878 A1 | 3/2009 | Woerner |
| 2009/0089133 A1 | 4/2009 | Johnson |
| 2009/0094623 A1 | 4/2009 | Chakra |
| 2009/0113310 A1 | 4/2009 | Appleyard |
| 2009/0133027 A1 | 5/2009 | Gunning |
| 2009/0167553 A1 | 7/2009 | Hong |
| 2009/0187454 A1 | 7/2009 | Khasin |
| 2009/0199113 A1 | 8/2009 | McWhinnie |
| 2009/0199192 A1 | 8/2009 | Laithwaite |
| 2009/0204463 A1 | 8/2009 | Burnett |
| 2009/0204471 A1 | 8/2009 | Elenbaas |
| 2009/0234699 A1 | 9/2009 | Steinglass |
| 2009/0235182 A1 | 9/2009 | Kagawa |
| 2009/0241053 A1 | 9/2009 | Augustine |
| 2009/0260010 A1 | 10/2009 | Burkhart |
| 2009/0287523 A1 | 11/2009 | Lau |
| 2009/0296908 A1 | 12/2009 | Lee |
| 2009/0299803 A1 | 12/2009 | Lakritz |
| 2009/0307319 A1 | 12/2009 | Dholakia |
| 2010/0005087 A1 | 1/2010 | Basco |
| 2010/0070888 A1 | 3/2010 | Watabe |
| 2010/0088137 A1 | 4/2010 | Weiss |
| 2010/0100594 A1 | 4/2010 | Frees |
| 2010/0106627 A1 | 4/2010 | O'Sullivan |
| 2010/0114786 A1 | 5/2010 | Aboujaoude |
| 2010/0115523 A1 | 5/2010 | Kuschel |
| 2010/0122334 A1 | 5/2010 | Stanzione |
| 2010/0131860 A1 | 5/2010 | Dehaan |
| 2010/0145801 A1 | 6/2010 | Chekuri |
| 2010/0169146 A1 | 7/2010 | Hoyne |
| 2010/0169802 A1 | 7/2010 | Goldstein |
| 2010/0169832 A1 | 7/2010 | Chang |
| 2010/0180212 A1 | 7/2010 | Gingras |
| 2010/0223575 A1 | 9/2010 | Leukart |
| 2010/0269049 A1 | 10/2010 | Fearon |
| 2010/0299171 A1 | 11/2010 | Lau |
| 2010/0306007 A1 | 12/2010 | Ganapathyraj |
| 2010/0312605 A1 | 12/2010 | Mitchell |
| 2010/0313151 A1 | 12/2010 | Wei |
| 2011/0015961 A1 | 1/2011 | Chan |
| 2011/0022662 A1 | 1/2011 | Barber-Mingo |
| 2011/0054968 A1 | 3/2011 | Galaviz |
| 2011/0055177 A1 | 3/2011 | Chakra |
| 2011/0060720 A1 | 3/2011 | Devereux |
| 2011/0071878 A1 | 3/2011 | Gingras |
| 2011/0071893 A1 | 3/2011 | Malhotra |
| 2011/0072372 A1 | 3/2011 | Fritzley |
| 2011/0093538 A1 | 4/2011 | Weir |
| 2011/0093619 A1 | 4/2011 | Nelson |
| 2011/0113365 A1 | 5/2011 | Kimmerly |
| 2011/0154216 A1 | 6/2011 | Aritsuka |
| 2011/0161128 A1* | 6/2011 | Barney ............. G06Q 10/06 715/764 |
| 2011/0184768 A1 | 7/2011 | Norton |
| 2011/0265188 A1* | 10/2011 | Ramaswamy ......... G06F 21/31 715/764 |
| 2011/0270644 A1 | 11/2011 | Roncolato |
| 2011/0307100 A1 | 12/2011 | Schmidtke |
| 2011/0307771 A1 | 12/2011 | Lok |
| 2011/0307772 A1 | 12/2011 | Lloyd |
| 2012/0030194 A1 | 2/2012 | Jain |
| 2012/0035942 A1 | 2/2012 | Graupner |
| 2012/0041983 A1 | 2/2012 | Jennings |
| 2012/0066030 A1 | 3/2012 | Limpert |
| 2012/0066411 A1 | 3/2012 | Jeide |
| 2012/0072251 A1 | 3/2012 | Mircean |
| 2012/0079449 A1 | 3/2012 | Sanderson |
| 2012/0110087 A1 | 5/2012 | Culver |
| 2012/0117499 A1 | 5/2012 | Mori |
| 2012/0123835 A1 | 5/2012 | Chu |
| 2012/0131191 A1 | 5/2012 | May |
| 2012/0158946 A1 | 6/2012 | Shafiee |
| 2012/0192086 A1 | 7/2012 | Ghods |
| 2012/0210247 A1 | 8/2012 | Khouri |
| 2012/0221963 A1 | 8/2012 | Motoyama |
| 2012/0226617 A1 | 9/2012 | Kay |
| 2012/0239451 A1 | 9/2012 | Caligor |
| 2012/0254218 A1 | 10/2012 | Ali |
| 2012/0266068 A1 | 10/2012 | Ryman |
| 2012/0278388 A1 | 11/2012 | Kleinbart |
| 2012/0296993 A1 | 11/2012 | Heyman |
| 2012/0304187 A1 | 11/2012 | Maresh |
| 2012/0317108 A1 | 12/2012 | Okazaki |
| 2013/0007332 A1 | 1/2013 | Teh |
| 2013/0013560 A1 | 1/2013 | Goldberg |
| 2013/0014023 A1 | 1/2013 | Lee |
| 2013/0018688 A1 | 1/2013 | Nudd |
| 2013/0021629 A1 | 1/2013 | Kurilin |
| 2013/0066944 A1 | 3/2013 | Laredo |
| 2013/0067375 A1 | 3/2013 | Kim |

(56) References Cited

U.S. PATENT DOCUMENTS

| | | |
|---|---|---|
| 2013/0067549 A1 | 3/2013 | Caldwell |
| 2013/0073328 A1 | 3/2013 | Ehrler |
| 2013/0073963 A1* | 3/2013 | Pendergast ............ G11B 27/034 715/716 |
| 2013/0080919 A1 | 3/2013 | Kiang |
| 2013/0103412 A1 | 4/2013 | Nudd |
| 2013/0124254 A1 | 5/2013 | Jafri |
| 2013/0124638 A1 | 5/2013 | Barreto |
| 2013/0151421 A1 | 6/2013 | Van Der Ploeg |
| 2013/0151604 A1 | 6/2013 | Ranade |
| 2013/0173486 A1 | 7/2013 | Peters |
| 2013/0179208 A1 | 7/2013 | Chung |
| 2013/0179799 A1 | 7/2013 | Savage |
| 2013/0198676 A1 | 8/2013 | Garrett |
| 2013/0215116 A1 | 8/2013 | Siddique |
| 2013/0227007 A1 | 8/2013 | Savage |
| 2013/0246110 A1 | 9/2013 | Nakhayi Ashtiani |
| 2013/0246399 A1 | 9/2013 | Schneider |
| 2013/0275229 A1 | 10/2013 | Moganti |
| 2013/0279685 A1 | 10/2013 | Kohler |
| 2013/0317871 A1 | 11/2013 | Kulkarni |
| 2013/0321467 A1 | 12/2013 | Tappen |
| 2013/0339099 A1 | 12/2013 | Aidroos |
| 2013/0339831 A1 | 12/2013 | Gulanikar |
| 2014/0007005 A1 | 1/2014 | Libin |
| 2014/0012603 A1 | 1/2014 | Scanlon |
| 2014/0012616 A1 | 1/2014 | Moshenek |
| 2014/0025767 A1 | 1/2014 | De Kezel |
| 2014/0036639 A1 | 2/2014 | Taber |
| 2014/0040780 A1 | 2/2014 | Brian |
| 2014/0040905 A1 | 2/2014 | Tadanobu |
| 2014/0058801 A1 | 2/2014 | Deodhar |
| 2014/0059910 A1 | 3/2014 | Norton |
| 2014/0074536 A1 | 3/2014 | Meushar |
| 2014/0075004 A1 | 3/2014 | Van Dusen |
| 2014/0089719 A1 | 3/2014 | Daum |
| 2014/0101310 A1 | 4/2014 | Savage |
| 2014/0143000 A1 | 5/2014 | Kay |
| 2014/0156539 A1 | 6/2014 | Brunet |
| 2014/0165001 A1 | 6/2014 | Shapiro |
| 2014/0172478 A1 | 6/2014 | Vadasz |
| 2014/0189017 A1 | 7/2014 | Prakash |
| 2014/0200944 A1 | 7/2014 | Henriksen |
| 2014/0208325 A1 | 7/2014 | Chen |
| 2014/0215344 A1 | 7/2014 | Ligman |
| 2014/0229609 A1 | 8/2014 | Wong |
| 2014/0236663 A1 | 8/2014 | Smith |
| 2014/0244334 A1 | 8/2014 | De |
| 2014/0257894 A1 | 9/2014 | Melahn |
| 2014/0279294 A1 | 9/2014 | Field-Darragh |
| 2014/0288987 A1 | 9/2014 | Liu |
| 2014/0304836 A1 | 10/2014 | Velamoor |
| 2014/0310047 A1 | 10/2014 | De |
| 2014/0310051 A1 | 10/2014 | Meng |
| 2014/0337279 A1* | 11/2014 | Mo ....................... G06F 16/176 707/608 |
| 2014/0350997 A1 | 11/2014 | Holm |
| 2014/0364987 A1 | 12/2014 | Shikano |
| 2014/0372860 A1 | 12/2014 | Craven |
| 2015/0006448 A1 | 1/2015 | Gupta |
| 2015/0007058 A1 | 1/2015 | Wooten |
| 2015/0007336 A1 | 1/2015 | Zang |
| 2015/0012330 A1 | 1/2015 | Sugiura |
| 2015/0052437 A1 | 2/2015 | Crawford |
| 2015/0058053 A1 | 2/2015 | De |
| 2015/0098561 A1 | 4/2015 | Etison |
| 2015/0106736 A1* | 4/2015 | Torman ................. G06F 16/907 715/745 |
| 2015/0113540 A1 | 4/2015 | Rabinovici |
| 2015/0134393 A1 | 5/2015 | De |
| 2015/0153906 A1 | 6/2015 | Liao |
| 2015/0193735 A1 | 7/2015 | Lavrov |
| 2015/0213411 A1 | 7/2015 | Swanson |
| 2015/0215256 A1 | 7/2015 | Ghafourifar |
| 2015/0262111 A1 | 9/2015 | Yu |
| 2015/0312113 A1 | 10/2015 | Forutanpour |
| 2015/0312375 A1 | 10/2015 | Valey |
| 2015/0317595 A1 | 11/2015 | De |
| 2015/0339006 A1 | 11/2015 | Chaland |
| 2015/0363092 A1 | 12/2015 | Morton |
| 2015/0363481 A1 | 12/2015 | Haynes |
| 2015/0363733 A1 | 12/2015 | Brown |
| 2015/0379472 A1 | 12/2015 | Gilmour |
| 2016/0012368 A1 | 1/2016 | O'Connell |
| 2016/0048408 A1 | 2/2016 | Madhu |
| 2016/0048786 A1 | 2/2016 | Fukuda |
| 2016/0063192 A1 | 3/2016 | Johnson |
| 2016/0063449 A1 | 3/2016 | Duggan |
| 2016/0072750 A1 | 3/2016 | Kass |
| 2016/0110670 A1 | 4/2016 | Chatterjee |
| 2016/0124775 A1 | 5/2016 | Ashtiani |
| 2016/0140474 A1 | 5/2016 | Vekker |
| 2016/0140501 A1 | 5/2016 | Figlin |
| 2016/0147773 A1 | 5/2016 | Smith |
| 2016/0147846 A1 | 5/2016 | Smith |
| 2016/0148157 A1 | 5/2016 | Walia |
| 2016/0180277 A1 | 6/2016 | Skiba |
| 2016/0180298 A1 | 6/2016 | McClement |
| 2016/0182311 A1 | 6/2016 | Borna |
| 2016/0188145 A1 | 6/2016 | Gabor |
| 2016/0216854 A1 | 7/2016 | McClellan |
| 2016/0224939 A1 | 8/2016 | Chen |
| 2016/0234391 A1 | 8/2016 | Wolthuis |
| 2016/0241609 A1 | 8/2016 | Xin |
| 2016/0275068 A1 | 9/2016 | Wenzel |
| 2016/0275436 A1 | 9/2016 | Kurjanowicz |
| 2016/0307210 A1 | 10/2016 | Agarwal |
| 2016/0313934 A1 | 10/2016 | Isherwood |
| 2016/0328217 A1 | 11/2016 | Hagerty |
| 2016/0342927 A1 | 11/2016 | Reznik |
| 2016/0352812 A1 | 12/2016 | Ahlgren |
| 2017/0004213 A1 | 1/2017 | Cunico |
| 2017/0009387 A1 | 1/2017 | Ge |
| 2017/0017364 A1 | 1/2017 | Kekki |
| 2017/0017924 A1 | 1/2017 | Kashiwagi |
| 2017/0039503 A1 | 2/2017 | Jones |
| 2017/0061341 A1 | 3/2017 | Haas |
| 2017/0068933 A1 | 3/2017 | Norton |
| 2017/0093874 A1 | 3/2017 | Uthe |
| 2017/0099296 A1 | 4/2017 | Fisher |
| 2017/0103369 A1 | 4/2017 | Thompson |
| 2017/0116552 A1 | 4/2017 | Deodhar |
| 2017/0132200 A1 | 5/2017 | Noland |
| 2017/0147960 A1 | 5/2017 | Jahagirdar |
| 2017/0153799 A1 | 6/2017 | Hoyer |
| 2017/0154024 A1 | 6/2017 | Subramanya |
| 2017/0177671 A1 | 6/2017 | Allgaier |
| 2017/0185592 A1 | 6/2017 | Frei |
| 2017/0192642 A1 | 7/2017 | Fishman |
| 2017/0206217 A1 | 7/2017 | Deshpande |
| 2017/0206501 A1 | 7/2017 | Wang |
| 2017/0249574 A1 | 8/2017 | Knijnik |
| 2017/0249577 A1 | 8/2017 | Nishikawa |
| 2017/0262294 A1 | 9/2017 | Yakan |
| 2017/0316358 A1 | 11/2017 | Candito |
| 2017/0316367 A1 | 11/2017 | Candito |
| 2017/0317898 A1 | 11/2017 | Candito |
| 2017/0323233 A1 | 11/2017 | Bencke |
| 2017/0323267 A1 | 11/2017 | Baek |
| 2017/0323350 A1 | 11/2017 | Laderer |
| 2017/0337517 A1 | 11/2017 | Defusco |
| 2017/0344754 A1 | 11/2017 | Kumar |
| 2017/0346861 A1 | 11/2017 | Pearl |
| 2017/0351385 A1 | 12/2017 | Ertmann |
| 2017/0364214 A1 | 12/2017 | Javed |
| 2018/0032524 A1 | 2/2018 | Byron |
| 2018/0052943 A1 | 2/2018 | Hui |
| 2018/0053127 A1 | 2/2018 | Boileau |
| 2018/0059910 A1 | 3/2018 | Wooten |
| 2018/0060785 A1 | 3/2018 | Carnevale |
| 2018/0060818 A1 | 3/2018 | Yorichika |
| 2018/0063063 A1 | 3/2018 | Yan |
| 2018/0068271 A1 | 3/2018 | Abebe |
| 2018/0075387 A1 | 3/2018 | Kulkarni |

(56) References Cited

U.S. PATENT DOCUMENTS

| | | |
|---|---|---|
| 2018/0082255 A1 | 3/2018 | Rosati |
| 2018/0088754 A1 | 3/2018 | Psenka |
| 2018/0089625 A1 | 3/2018 | Rosati |
| 2018/0095938 A1 | 4/2018 | Monte |
| 2018/0101807 A1 | 4/2018 | Ni |
| 2018/0102989 A1 | 4/2018 | Borsutsky |
| 2018/0131649 A1 | 5/2018 | Ma |
| 2018/0157477 A1 | 6/2018 | Johnson |
| 2018/0165610 A1 | 6/2018 | Dumant |
| 2018/0173386 A1 | 6/2018 | Adika |
| 2018/0189706 A1 | 7/2018 | Newhouse |
| 2018/0189735 A1 | 7/2018 | Lo |
| 2018/0189736 A1 | 7/2018 | Guo |
| 2018/0225795 A1 | 8/2018 | Napoli |
| 2018/0247352 A1 | 8/2018 | Rogers |
| 2018/0260081 A1 | 9/2018 | Beaudoin |
| 2018/0262620 A1 | 9/2018 | Wolthuis |
| 2018/0285471 A1 | 10/2018 | Hao |
| 2018/0285746 A1 | 10/2018 | Dunwoody |
| 2018/0300305 A1 | 10/2018 | Lam |
| 2018/0316636 A1 | 11/2018 | Kamat |
| 2018/0331842 A1 | 11/2018 | Faulkner |
| 2018/0336520 A1 | 11/2018 | Davis |
| 2018/0349108 A1 | 12/2018 | Brebner |
| 2018/0349829 A1 | 12/2018 | Peterson |
| 2018/0357049 A1 | 12/2018 | Epstein |
| 2018/0367477 A1 | 12/2018 | Hariram |
| 2018/0367483 A1 | 12/2018 | Rodriguez |
| 2018/0373804 A1 | 12/2018 | Zhang |
| 2019/0005048 A1 | 1/2019 | Crivello |
| 2019/0014070 A1 | 1/2019 | Mertvetsov |
| 2019/0018552 A1 | 1/2019 | Bloy |
| 2019/0034057 A1 | 1/2019 | Rudchenko |
| 2019/0068390 A1 | 2/2019 | Gross |
| 2019/0079909 A1 | 3/2019 | Purandare |
| 2019/0080289 A1 | 3/2019 | Kreitler |
| 2019/0089581 A1 | 3/2019 | Purandare |
| 2019/0095839 A1 | 3/2019 | Itabayashi |
| 2019/0095846 A1 | 3/2019 | Gupta |
| 2019/0102071 A1 | 4/2019 | Redkina |
| 2019/0102364 A1 | 4/2019 | Rochiramani |
| 2019/0102700 A1 | 4/2019 | Babu |
| 2019/0138583 A1 | 5/2019 | Silk |
| 2019/0138589 A1 | 5/2019 | Udell |
| 2019/0138961 A1 | 5/2019 | Santiago |
| 2019/0139004 A1 | 5/2019 | Vukovic |
| 2019/0147386 A1 | 5/2019 | Balakrishna |
| 2019/0187987 A1 | 6/2019 | Fauchère |
| 2019/0213509 A1 | 7/2019 | Burleson |
| 2019/0265821 A1 | 8/2019 | Pearl |
| 2019/0286462 A1 | 9/2019 | Bodnick |
| 2019/0318285 A1 | 10/2019 | Sebilleau |
| 2019/0340296 A1 | 11/2019 | Cunico |
| 2019/0340518 A1 | 11/2019 | Merrill |
| 2019/0340554 A1 | 11/2019 | Dotan-Cohen |
| 2019/0340574 A1 | 11/2019 | Ekambaram |
| 2019/0347094 A1 | 11/2019 | Sullivan |
| 2019/0347126 A1 | 11/2019 | Bhandari |
| 2019/0370320 A1 | 12/2019 | Kalra |
| 2020/0005241 A1 | 1/2020 | Westwood |
| 2020/0019907 A1 | 1/2020 | Notani |
| 2020/0059539 A1 | 2/2020 | Wang |
| 2020/0065736 A1 | 2/2020 | Relangi |
| 2020/0145239 A1 | 5/2020 | Ghods |
| 2020/0162315 A1 | 5/2020 | Siddiqi |
| 2020/0192538 A1 | 6/2020 | Karpe |
| 2020/0192908 A1 | 6/2020 | Smith |
| 2020/0193556 A1 | 6/2020 | Jin |
| 2020/0218551 A1 | 7/2020 | Sabo |
| 2020/0228474 A1 | 7/2020 | Cameron |
| 2020/0233879 A1 | 7/2020 | Papanicolaou |
| 2020/0244611 A1 | 7/2020 | Rosenstein |
| 2020/0328906 A1 | 10/2020 | Raghavan |
| 2020/0344253 A1 | 10/2020 | Kurup |
| 2021/0004380 A1 | 1/2021 | Koch |
| 2021/0004381 A1 | 1/2021 | Smith |
| 2021/0035069 A1 | 2/2021 | Parikh |
| 2021/0049555 A1 | 2/2021 | Shor |
| 2021/0073697 A1 | 3/2021 | Paranjape |
| 2021/0097466 A1 | 4/2021 | Sabo |
| 2021/0097490 A1 | 4/2021 | Ratcliff |
| 2021/0103451 A1 | 4/2021 | Sabo |
| 2021/0110347 A1 | 4/2021 | Khalil |
| 2021/0133162 A1 | 5/2021 | Arnold |
| 2021/0136012 A1 | 5/2021 | Barbitta |
| 2021/0141996 A1 | 5/2021 | Agrawal |
| 2021/0149925 A1 | 5/2021 | Mann |
| 2021/0157978 A1 | 5/2021 | Haramati |
| 2021/0182475 A1 | 6/2021 | Pelz |
| 2021/0192129 A1 | 6/2021 | Garg |
| 2021/0209239 A1 | 7/2021 | Robinson |
| 2021/0209535 A1 | 7/2021 | Tezak |
| 2021/0216562 A1 | 7/2021 | Smith |
| 2021/0232282 A1 | 7/2021 | Karpe |
| 2021/0248304 A1 | 8/2021 | Olivier |
| 2021/0320891 A1 | 10/2021 | Rosenstein |
| 2021/0342361 A1 | 11/2021 | Radzewsky |
| 2021/0342785 A1 | 11/2021 | Mann |
| 2021/0342786 A1 | 11/2021 | Jiang |
| 2021/0382734 A1 | 12/2021 | Rosenstein |
| 2022/0019320 A1 | 1/2022 | Sabo |
| 2022/0019959 A1 | 1/2022 | Roy |
| 2022/0029886 A1 | 1/2022 | Hameiri |
| 2022/0058334 A1 | 2/2022 | Joshi |
| 2022/0058548 A1 | 2/2022 | Garg |
| 2022/0075792 A1 | 3/2022 | Koch |
| 2022/0078142 A1 | 3/2022 | Cameron |
| 2022/0101235 A1 | 3/2022 | Khalil |
| 2022/0158859 A1 | 5/2022 | Raghavan |
| 2022/0215315 A1 | 7/2022 | Sabo |
| 2022/0309037 A1 | 9/2022 | Gutierrez |
| 2022/0391921 A1 | 12/2022 | Wilner |
| 2023/0214509 A1 | 7/2023 | Kahawala |
| 2023/0252415 A1 | 8/2023 | Ackerman-Greenberg |
| 2023/0306370 A1 | 9/2023 | Clifton |
| 2024/0013153 A1 | 1/2024 | Jiang |
| 2024/0171621 A1 | 5/2024 | Ye |
| 2024/0220930 A1 | 7/2024 | Clifton |
| 2024/0310990 A1 | 9/2024 | Beauchamp |
| 2024/0346449 A1 | 10/2024 | Beauchamp |
| 2024/0386382 A1 | 11/2024 | Adams |
| 2025/0036863 A1 | 1/2025 | Davies |

FOREIGN PATENT DOCUMENTS

| | | |
|---|---|---|
| CN | 102378975 B | 5/2015 |
| JP | 3973263 B2 | 9/2007 |
| JP | 2008059035 A | 3/2008 |
| JP | 4315508 B2 | 8/2009 |
| JP | 4335340 B2 | 9/2009 |
| WO | 2007064690 A2 | 6/2007 |
| WO | 2015029073 A2 | 3/2015 |
| WO | 2015036817 A1 | 3/2015 |
| WO | 2015123751 A1 | 8/2015 |
| WO | 2016115621 A1 | 7/2016 |
| WO | 2020006634 A1 | 1/2020 |

OTHER PUBLICATIONS

"U.S. Appl. No. 14/584,750, Examiner Interview Summary mailed Feb. 25, 2016", 3 pgs.

"U.S. Appl. No. 14/584,750, Non Final Office Action mailed Aug. 28, 2015", 21 pgs.

"U.S. Appl. No. 14/584,750, Notice of Allowance mailed Mar. 28, 2016", 8 pgs.

"U.S. Appl. No. 14/584,750, Response filed Feb. 29, 2015 to Non Final Office Action mailed Aug. 28, 2015", 16 pgs.

"U.S. Appl. No. 14/584,850, Final Office Action mailed Sep. 1, 2017", 31 pgs.

"U.S. Appl. No. 14/584,850, Non Final Office Action mailed Jan. 10, 2017", 9 pgs.

"U.S. Appl. No. 14/584,850, Response filed Apr. 10, 2017 to Non Final Office Action mailed Jan. 10, 2017", 13 pgs.

(56) References Cited

OTHER PUBLICATIONS

"How to Asana: Inviting teammates to Asana." YouTube, Asana, Mar. 21, 2017, https://www.youtube.com/watch?v=TLOruY1KyxU (Year: 2017), 13 pages.

"Rules of Data Conversion from Document to Relational Databases", published: 2014, publisher: Future-processing, pp. 1-8 (Year: 2014).

(Tiburca, Andrew) Best Team Calendar Applications for 2018—Toggl https://toggl.com/blog/best-team-calendar-applications-for-2018 (Year: 2017) 3 pages.

Asana Demo and Product Tour, you tube excerpt, Dec. 7, 2017 https://www.youtube.com/watch?v=IMAFWVLGFyw (Year: 2017) (16 pages).

Asana integrations, Asana tutorial, youtube, excerpt, Nov. 16, 2016 https://www.youtube.com/watch?v=hBiQ7DJNinE (Year: 2016) (21 pages).

Asana Workload and Portfolios, youtube, excerpt, Aug. 1, 2019 https://www.youtube.com/watch?v=7XkNcfFDG6M (Year: 2019) (20 pages).

Asana YouTube channel, list of all product videos, Nov. 19, 2014-Aug. 19, 2019 https://www.youtube.com/user/AsanaTeam/videos?disable_polymer=1 (Year: 2019) (5 pages).

Asana, Task dependencies, archives org, Aug. 25, 2017 https://web.archive.org/web/20170825002141/https://asana.com/guide/help/tasks/dependencies (Year: 2017) (5 pages).

Asana,Manage your team capacity with Workload, youtube, excerpt, Aug. 1, 2019 https://www.youtube.com/watch?v=2ufXyZDzZnA&list=PLJFG93oi0wJAi UwyOhIGWHdtJzJrzyIBv (Year: 2019) (1 page).

Assef, F., Cassius, T. S., & Maria, T. S. (2018). Confrontation between techniques of time measurement. Journal of Manufacturing Technology Management, 29(5), 789-810. (Year: 2018).

Biggs, "GateGuru Relaunches With New Ways to Streamline Your Travel Experience", Techcrunch, (Apr. 26, 2013), 3 pgs.

Castaneda Samuel, Introduction Manual—Asana, Sep. 25, 2017 https://static1.squarespace.com/static/586d532ae58c6232db243a65/t/5c210c10f950b7fc7a8e3274/1545669658049/Asana+Manual.pdf (Year: 2017) (20 pages).

Command and control, wikipedia, archives org, Mar. 16, 2018 https://web.archive.org/web/20180316193655/https://en.wikipedia.org/wiki/Command_and_control (Year: 2018), 6 pages.

Creating Tables with Fields from 2 Different Tables, published: 2009, publisher: StackOverflow, pp. 1-2. (Year: 2009).

Critical chain project management, Wikipedia, archives org, Dec. 17, 2016 https://web.archive.Org/web/20161217090326/https://en.wikipedia.org/wiki/Critical_chain_project_management (Year: 2016) 5 pages.

Critical Path Method, Wikipedia, archives org, Sep. 19, 2017 https://web.archive.Org/web/20170919223814/https://en.wikipedia.org/wiki/Critical_path_method (Year: 2017) 6 pages.

Dawei Li, "Deepcham: Collaborative Edge-Mediated Adaptive Deep Learning for Mobile Object Recognition", 2016, IEEE/ACM, pp. 64-76. (Year: 2016).

Fruhlinger, Joshua. "The Best To-Do ListApps for Feeling Productive; With the right app, feeling productive can be just as gratifying as actually getting things done" Wall Street Journal (Online); New York, N.Y. [New York, N.Y]Nov. 8, 2013 (Year: 2013) 4 pages.

Hartmann, "TimeProjectscheduling with resource capacities and requests varying with time: a case study," 2013, Flexible services and manufacturing journal, vol. 25, No. 1, pp. 74-93 (Year: 2013).

Helen Mongan-Rallis & Terrie Shannon, "Synchronous Chat," Aug. 2016, Dept. of Education, Univ. of MN Duluth, web.archive.org/web/20160825183503/https://www.d.umn.edu/hrallis/professional/presentations/cotfsp06/indiv_tools/sync_chat.htm (Year: 2016) (2 pages).

How to Asana Asana time tracking, youtube, excerpt, May 24, 2017 https://www.youtube.com/watch?v=z91qlex-TLc (Year: 2017) (1 page).

How to Asana, Asana project management, youtube, excerpt, Mar. 7, 2017 https://www.youtube.com/watch?v=qqANMTvVpE (Year: 2017) (28 pages).

How to Asana, Creating your first Asana project, youtube, excerpt, Jan. 31, 2017 https://www.youtube.com/watch?v=L04WmcUdsLo (Year: 2017) (1 page).

How to Asana, Getting Asana into your workflow, youtube, excerpt, Jul. 17, 2017 https://www.youtube.com/watch?v=7YLrNMdv30 (Year: 2017) (24 pages).

How to Asana, Planning with Asana calendar, youtube excerpt, Feb. 14, 2017 https://www.youtube.com/watch?v=w8t6KYiVPyc (Year: 2017) (19 pages).

How to Asana, Using Asana for task management, youtube, excerpt, Feb. 7, 2017 https://www.youtube.com/watch?v=vwvbgiejhQ (Year: 2017) (8 pages).

How to Asana, Visualizing work with Asana kanban boards, youtube, excerpt, Feb. 21, 2017 https://www.youtube.com/watch?v=jmZaZGydfPY (Year: 2017) (41 pages).

How to Asana, Workflow management, youtube, excerpt, May 30, 2017 https://www.youtube.com/watch?v=rk8nPWmXsRo (Year: 2017) (9 pages).

How to use Advanced Search in Asana, Asana tutorial, May 25, 2016 https://www.youtube.com/watch?v=5VyJ3toPfQM (Year: 2016) (28 pages).

Justin Rosenstein, Unveiling the Future of Asana, Mar. 28, 2018 https://www.youtube.com/watch?v=nRI?d_WM4Bc (Year: 2018) (2 pages).

Klipfoliio. "What is a Project Management Dashboard?". Jan. 18, 2021. <https://web.archive.org/web/20210128061955/https:// www.klipfolio.com/resources/articles/project-management-dashboard > (Year: 2021) 6 pages.

Lauren Labrecque, "Fostering Consumer-Brand Relationships in Social Media Environments: The Role of Parasocial Interaction", 2014, Journal of Interactive Markeing, 28 (2014), pp. 134-148 (Year: 2014).

Macro, computer science, wikipedia, archives org, 6 pages, Feb. 11, 2020 http://web.archive.org/web/20200211082902/https://en.wikipedia.org/wiki/Macro_(computer_science) (Year: 2020) 6 pages.

Mauricio Aizawa, Zapier, How to Automate Asana Tasks creation using Evernote, youtube excerpts, Mar. 16, 2018 https://www.youtube.com/watch?v=BjDQ4Gny4WI (Year: 2018) (8 pages).

N. C. Romano, Fang Chen and J. F. Nunamaker, "Collaborative Project Management Software," Proceedings of the 35th Annual Hawaii International Conference on System Sciences, 2002, pp. 233-242, doi: 10.1109/HICSS.2002.993878.

Paul Minors, How to automate your tasks, youtube excerpts, Oct. 18, 2019 https://www.youtube.com/watch?v=lwF9XyUQrzw (Year: 2019).

Prioritize My Tasks in Asana, Asana tutorial, youtube, excerpt, May 25, 2016 https://www.youtube.com/watch?v=UbCnMvw01nl (Year: 2016) (3 pages).

Project views, Asana tutorial, youtube, excerpt May 25, 2016 https://www.youtube.com/watch?v=FYjA8ZH3ceQ (Year: 2016) (5 pages).

Shivakumar; Complete Guide to Digital Project Management; 2018; Apress; (https://doi.org/10.1007/978-1-4842-3417-4; last access Mar. 6, 2023).

Using Asana Premium, Asana tutorial, youtube, excerpt, Sep. 10, 2016 https://www.youtube.com/watch?v=vMgLtDDmyeo (Year: 2016) (4 pages).

Where does Asana fit in, archives org, Jul. 8, 2017 https://web.archive.org/web/20170708150928/https://asana.com/guide/resources/infosheets/where-does-asana-fit (Year: 2017) (5 pages).

Wix.com, How to Use Wix Code with Marketing Tools to Create Custom Events, Oct. 18, 2018, YouTube, https://www.youtube.com/watch?v=MTBVykOYGvO&feature=emb_title, 2 pages.

Www.asana.com (as retrieved from https://web.archive.Org/web/20160101054536/https://asana.com/press and https://web.archive.org/web/20160101054527/https://asana.com/product) (Year: 2016) 15 pages.

Www.cogmotive.com/blog/author/alan Alan Byrne: "Creating a company Shared Calendar in Office 365"; pp. 1-17; Sep. 10, 2013 (16 pages).

(56) References Cited

OTHER PUBLICATIONS

Booch, Grady, and Alan W. Brown. "Collaborative development environments." Adv. Comput. 59.1 (2003): 1-27. (Year: 2003).
Heerwagen, Judith H., et al. "Collaborative knowledge work environments." Building research & information 32,6 (2004): 510-528. (Year: 2004).
Luff, Paul, Christian Heath, and David Greatbatch. "Tasks-in-interaction: paper and screen based documentation in collaborative activity." Proceedings of the 1992 ACM conference on Computer-supported cooperative work. 1992. (Year: 1992).
Asana website; Mar. 12, 2020(https://web.archive.org/web/20200312140636/https://asana.com/guide/help/)(see attached pdf for sublinks) (Year: 2020).
N. S. Jyothi and A. Parkavi, "A study on task management system," 2016 International Conference on Research Advances in Integrated Navigation Systems (RAINS), Bangalore, India, 2016, pp. 1-6, doi: 10.1109/RAINS.2016.7764421. (Year: 2016).

\* cited by examiner

SYSTEMS AND METHODS TO FACILITATE INTERACTION WITH A COLLABORATION ENVIRONMENT BASED ON ASSIGNMENT OF PROJECT-LEVEL ROLES

FIELD OF THE DISCLOSURE

The present disclosure relates to systems and methods to facilitate interaction with a collaboration environment based on assignment of project-level roles.

BACKGROUND

Collaboration environments, sometimes referred to as work management platforms, may enable users to assign projects, tasks, or other assignments to assignees (e.g., other users) to complete. A collaboration environment may comprise an environment in which individual users and/or a virtual team of users does its work and may enable users to work in a more organized and efficient manner. Projects are a way to organize groups of tasks.

SUMMARY

One aspect of the present disclosure relates to a system configured to facilitate interaction with a collaboration environment based on assignment of project-level roles. A project may include one or more units of work subordinate to the project, that make up the project, and/or otherwise support the project. Organizing at the project-level may be difficult for a variety of reasons. For example, it may be difficult to keep track of the multiple units of work that need to be completed, when they should be completed, the assignment of users to the units of work, and the roles of users in those units of work, in order to otherwise maintain control of the project. There has yet to be a concise way to organize workflow on a project-level within an online collaboration environment which differs from the organization of the units of work that that make up a project.

One or more implementations presented herein propose assignment of users to different roles at the project level. The project-level roles may differ from the roles of the users in the individual units of work. For example, a user may be an "owner" of a project, and also an "engineer" for a unit of work that supports the project. Project-level roles may provide users certain permissions and/or privileges at the project-level and/or for individual units of work that make up a project. These permissions and/or privileges may facilitate certain access to the projects and/or units of work that make up the projects. The access may be characterized based on enabling and/or disabling one or more features. The one or more features may include one or more of editing, internal and/or external communication, meeting generation, and/or other features.

One or more implementations of a system to facilitate interaction with a collaboration environment based on assignment of project-level roles may include one or more hardware processors configured by machine-readable instructions and/or other components. Executing the machine-readable instructions may cause the one or more hardware processors to facilitate interaction with a collaboration environment based on assignment of project-level roles. The machine-readable instructions may include one or more computer program components. The one or more computer program components may include one or more of an environment state component, a role management component, a user interface component, and/or other components.

The environment state component may be configured to manage environment state information maintaining a collaboration environment and/or other information. The collaboration environment may be configured to facilitate interaction by users with the collaboration environment. The environment state information may define one or more of work unit records, project records, and/or other records. The work unit records may include work information comprising values of work unit parameters defining units of work managed, created, and/or assigned to the users within the collaboration environment. The project records may include project information comprising values for project parameters associated with projects managed within the collaboration environment.

An individual project may include an individual set of the units of work. An individual set of units of work of an individual project may be subordinate to the individual project, may make up the individual project, and/or may otherwise support the individual project. An individual set of units of work may directly facilitate progress toward fulfillment of an individual project. The individual set of units of work may directly contribute to the progress. By way of non-limiting illustration, a connection between the individual set of units of work and a corresponding individual project may be direct in that completion of at least one of the units of work may have a direct impact on progress toward fulfillment of the individual project. The concept of "direct impact" may mean that completion of the at least one unit of work may cause progress toward fulfillment of individual project based on independent action completed and/or started with respect to the at least one unit of work. Accordingly, completion of individual set of units of work may indicate that the individual project has been completed and/or fulfilled.

The role management component may be configured to obtain role information specifying roles of the users within the units of work and/or within the projects. The roles may convey an expected contribution of the users in completing and/or supporting the units of work and/or the projects. The individual roles of individual users within the units of work may be specified separately from the individual roles of the individual users within the individual projects. By way of non-limiting illustration, a first user may have a first role within a first unit of work, a second role within a first project, and/or other roles within other units of work and/or projects. The first project may include the first unit of work and one or more other units of work.

The environment state component may be configured to update the environment state information based on the role information and/or other information. By way of non-limiting illustration, the work unit parameters may include a work unit role parameter characterizing the individual roles of the individual users with respect to individual units of work. The project parameters include a project role parameter characterizing the individual roles of the individual users with respect to individual projects. By way of non-limiting illustration, a first value of the work unit role parameter for the first unit of work may specify that the first user has the first role within the first unit of work. A second value of the project role parameter for the first project may specify that the first user has the second role within the first project.

The user interface component may be configured to effectuate presentation of the collaboration environment based on the environment state information and/or other information. In some implementations, access by the users to the individual units of work and/or the individual projects may reflect the roles of the users within the units of work and/or the projects.

As used herein, any association (or relation, or reflection, or indication, or correspondency) involving servers, processors, client computing platforms, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
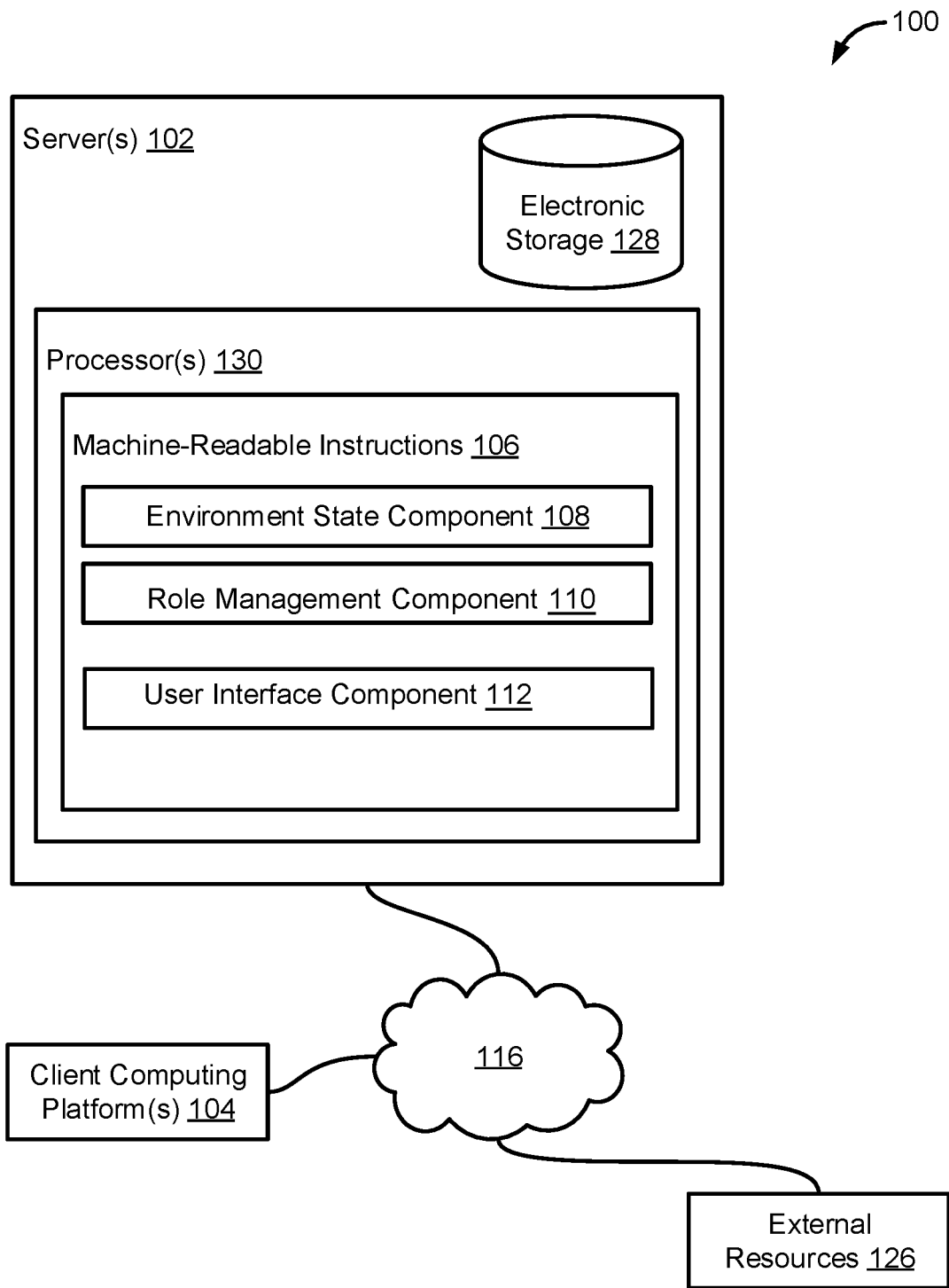
FIG. 1 illustrates a system configured to facilitate interaction with a collaboration environment based on assignment of project-level roles, in accordance with one or more implementations.

FIG. 1 illustrates a system 100 configured to facilitate interaction with a collaboration environment based on assignment of project-level roles, in accordance with one or more implementations. A project may include one or more units of work subordinate to the project, that make up the project, and/or otherwise support the project. To organize workflow at the project-level, users may be assigned roles at the project level. The project-level roles may differ from the roles of the users in the individual units of work that make up projects. Project-level roles may provide users certain permissions and/or privileges at the project-level and/or for individual units of work. These permissions and/or privileges may facilitate improved project organization and/or control by enabling and/or disabling access to one or more features available within the collaboration environment.

In some implementations, system 100 may include one or more of one or more servers 102, one or more client computing platforms 104, external resources 126, and/or other components. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may include one or more of non-transitory electronic storage 128, one or more processors 130 configured by machine-readable instructions 106, and/or other components. The non-transitory electronic storage 128 may store one or more records and/or other information. Machine-readable instructions 106 may include one or more instruction components. The instruction components may include computer program components. Executing the machine-readable instructions 106 may cause server(s) 102 to facilitate interaction with a collaboration environment based on assignment of project-level roles. The computer program components may include one or more of an environment state component 108, a role management component 110, a user interface component 112, and/or other components.

Environment state component 108 may be configured to manage environment state information and/or other information used in maintaining a collaboration environment. The collaboration environment may be configured to facilitate interaction by users within the collaboration environment. The environment state information may include one or more of user records, work unit records, project records, objective records, and/or other records. The user records may include user information comprising values of user parameters. The work unit records which may include work information comprising values for work unit parameters associated with units of work managed, created, and/or assigned within the collaboration environment. The project records may include project information including values for project parameters associated with projects managed within the collaboration environment. An individual project may include an individual set of the units of work.

The user information in the user records may include values of user parameters. The values of the user parameters may be organized in user records corresponding to users interacting with and/or viewing the collaboration environment. The values of the user parameters may include information describing the users, their actions within the collaboration environment, their settings, and/or other user information; and/or metadata associated with the users, their actions within the environment, their settings, and/or other user information. Individual ones of the users may be associated with individual ones of the user records. A user record may define values of the user parameters associated with a given user.

The values of the user parameters may, by way of non-limiting example, specify one or more of: a user name, a group parameter, a user account, a user department, descriptive user content, a to-email, a from-email, a photo, an organization, a workspace, one or more user comments, one or more teams the user belongs to, one or more of the user display settings (e.g., colors, size, project order, task order, other unit of work order, etc.), one or more authorized applications, one or more interaction parameters (e.g., indicating a user is working on/worked on a given unit of work, a given user viewed a given work unit of work, a given user selected a given unit of work, a timeframe a given user last interacted with and/or worked on a given unit of work, a time period that a given unit of work has been idle, and/or other interaction parameters), one or more notification settings, one or more progress parameters, status information for one or more work units the user is associated with (units of work assigned to the user, assigned to other users by the user, completed by the user, past-due date, and/or other information), progress information for one or more business objectives the user is associated with (business objectives owned by the user, of which the user is a collaborator, fulfilled by the user, past-due date, and/or other information), one or more performance/productivity metrics of a given user (e.g., how many units of work the user has completed, how quickly the user completed the units of work, how quickly the user completes certain types of work units, the efficiency of the user, bandwidth of the user, activity level of the user, how many business objectives the user has helped fulfill through their completion of units of work, etc.), application access information (e.g., username/password for one or more third-party applications), one or more favorites and/or priorities, preference information, and/or other information.

The preference information may include user preferences for individual projects (e.g., project preferences) and/or other parts of the collaboration environment. By way of non-limiting illustration, project preferences may include one or more of quantity of the units of work within the individual projects, arrangement of the units of work within the individual projects, dependency of the units of work within the individual projects, assignment of the individual users to the units of work within the individual projects, the roles of the individual users assigned to the units of work within the individual projects, and/or other information.

The work information in the work unit records may include values of one or more work unit parameters. The values of the work unit parameters may be organized in work unit records corresponding to units of work managed, created, and/or assigned within the collaboration environment. A given unit of work may have one or more assignees and/or collaborators working on the given work unit. Units of work may include one or more to-do items, action items, objectives, and/or other units of work one or more users should accomplish and/or plan on accomplishing. Units of work may be created by a given user for the given user and/or created by the given user and assigned to one or more other users. Individual units of work may include one or more of an individual task, an individual sub-task, and/or other units of work assigned to and/or associated with one or more users. Individual units of work may include one or more digital content items. An individual unit of work may include an individual digital content item by virtue of the individual digital content item (and/or a copy or instance thereof) being attached and/or appended thereto. A digital content item may include one or more of an image, a video, an audio file, a PDF, a word document, and/or other digital content items.

In some implementations, units of work created by, assigned to, and/or completed by the users may refer generally to a linking of the units of work with the individual users in the collaboration environment. A unit of work may be linked with a user in a manner that defines one or more relationships between the user and the unit of work. Such a relationship may connote and/or be a result of an action (past, present, and/or future) of the user with respect to the unit of work. Such actions may include one or more of creating a work unit record for a unit of work, being assigned to participate in a unit of work, participating in a unit of work, being granted access to a work unit record of a unit of work, adjusting a value of a work unit parameter of a work unit record of a unit of work, and/or other actions.

Individual sets of work unit records may be defined by a record hierarchy. A record hierarchy may convey individual positions of work unit records (and their corresponding units of work) in the record hierarchy. By way of non-limiting illustration, a position may specify one or more of a work unit record being superior to another work unit record, a work unit record being subordinate to another work unit record, and/or other information. As a result, individual work unit records in the individual sets of work unit records may be subordinate to other individual work unit records in the individual sets of work unit records. For example, a work unit record may define a unit of work comprising a task, and a subordinate work unit record may define a unit of work comprising a sub-task to the task. A record hierarchy may define a relationship between work unit records. A work unit record may have some restrictions placed on it by virtue of having a subordinate work unit record. By way of non-limiting illustration, a work unit record may be restricted from access by one or more users unless and/or until a subordinate work unit record is completed and/or started.

Individual work unit records may include hierarchical information defining a record hierarchy of the individual work unit records. The hierarchical information of a work unit record may include one or more of information identifying other work unit records associated in a record hierarchy the work unit record belongs to, a specification of the position of the work unit record in the hierarchy, restrictions and/or other relationships placed on the work unit record by virtue of its position, and/or other information.

In some implementations, the one or more work unit parameters may include one or more of a work assignment parameter, a work management parameter, work creation parameter, a work unit role parameter, and/or other parameters. The values of the work assignment parameter may describe units of work assigned to the individual users. The values of the work management parameter may describe units of work managed by the individual users. The values of the work creation parameter may describe units of work created by the individual users. The work unit role parameter may characterize individual roles of the individual users with respect to individual units of work. The value of the work unit role parameter may comprise a description and/or title of the role.

In some implementations, values of work unit parameters may include one or more of a unit of work name, a unit of work description, one or more unit of work dates (e.g., a start date, a due date or end date, a completion date, and/or dates), role information, a status parameter (e.g., an update, a hardcoded status update, a completed/incomplete/mark complete, a measured status, a progress indicator, quantity of sub-work units remaining for a given unit of work, measure of urgency, and/or other status parameter), one or more user comment parameters (e.g., permission for who may make comments such as an assignee, an assignor, a recipient, one or more followers, and/or one or more other interested parties; content of the comments; one or more times; presence or absence of the functionality of up-votes; one or more hard-coded responses; and/or other parameters), one or more interaction parameters (e.g., indicating a given unit of work is being worked on/was worked on, a given work unit of work was viewed, a given unit of work was selected, how long the given unit of work has been idle, a last interaction parameter indicating when and what user last interacted with the given unit of work, users that interacted with the given unit of work, quantity and/or content of comments on the unit of work, and/or other interaction parameters indicating sources of the interactions, context of the interactions, content of the interactions and/or time for the interactions), one or more digital content item attachments, notification settings, privacy, an associated URL, one or more interaction parameters (e.g., sources of the interactions, context of the interactions, content of the interactions, time for the interactions, and/or other interaction parameters), updates, ordering of units of work within a given unit of work (e.g., tasks within a project, subtasks within a task, etc.), state of a workspace for a given unit of work (e.g., application state parameters, application status, application interactions, user information, and/or other parameters related to the state of the workspace for a unit of work), one or more performance/productivity metrics for a given unit of work, hierarchical information, one or more custom fields (e.g., priority, cost, stage, and/or other custom fields), and/or other information.

The values of the work assignment parameter describing units of work assigned to the individual users may be determined based on one or more interactions by one or more users with a collaboration environment. In some implementations, one or more users may create and/or assign one or more unit of work to themselves and/or another user. In some implementations, a user may be assigned a unit of work and the user may effectuate a reassignment of the unit of work from the user or one or more other users.

In some implementations, values of the work assignment parameter may indicate that a status parameter of a unit of work has changed from "incomplete" to "marked complete" and/or "complete". In some implementations, a status of complete for a unit of work may be associated with the passing of an end date associated with the unit of work. In some implementations, a status of "marked complete" may be associated with a user providing input via the collaboration environment at the point in time the user completes the unit of work (which may be before or after an end date).

In some implementations, managing by the environment state component 108 include maintaining queues of the units of work assigned to the users. The queues may be presented to the users in a user interface of the collaboration environment to facilitate access to the units of work via work unit pages. A work unit page for a unit of work may comprise a user interface portion and/or dedicated user interface of the collaboration environment from which users access the unit of work. Individual queues may represent the units of work assigned to individual users organized in an order based on the individual end dates and/or other dates (e.g., start dates) and/or other ordering. Individual queues may be presented in a user interface based on one or more of a list view, a calendar view, and/or other views. The calendar view may be a calendar view by week, by more than one week (e.g., $1^{st}$ through $15^{th}$), by month, by more than one month (e.g., May through July), and/or other calendar views. Units of work may be represented in a calendar view by user interface elements (e.g., icons, calendar entries, etc.).

Project information in project records may define values of project parameters for projects managed within the collaboration environment. An individual project may include an individual set of the units of work. An individual set of units of work of an individual project may be subordinate to the individual project, make up the individual project, and/or otherwise support the individual project. The individual set of units of work may directly facilitate progress toward fulfillment of the individual project. The individual set of units of work may directly contribute to the progress. By way of non-limiting illustration, a connection between the individual set of units of work and a corresponding individual project may be direct in that completion of at least one of the units of work may have a direct impact on progress toward fulfillment of the individual project. The concept of "direct impact" may mean that completion of the at least one unit of work may cause progress toward fulfillment of individual project based on independent action completed and/or started with respect to the at least one unit of work. Accordingly, completion of an individual set of units of work may indicate that the individual project has been completed and/or fulfilled.

The project parameters may characterize one or more projects managed within the collaboration environment and/or via the collaboration environment, and/or the metadata associated with the one or more projects. Individual ones of the projects may be associated with individual ones of the project records. The project information may define values of the project parameters associated with a given project managed within the collaboration environment and/or via the collaboration environment. A given project may have one or more owners and/or one or more collaborators working on the given project. The given project may include one or more units of work assigned to one or more users under the given project heading. In some implementations, projects may include one or more units of work that may directly facilitate progress toward fulfillment of the projects. Accordingly, completion of the set of units of work may directly contribute to progress toward fulfillment of the project. By way of non-limiting illustration, an individual project may be associated with a client and the units of work under the individual project heading may be work directly contributing to the fulfillment of a business relationship with the client.

The values of the project parameters may, by way of non-limiting example, include one or more of: one or more units of work within the project (which may include values of work unit parameters defined by one or more work unit records), role information, one or more user comment parameters (e.g., a creator, a recipient, one or more followers, one or more other interested parties, content, one or more times, upvotes, other hard-coded responses, etc.), a project name, a project description, one or more project dates (e.g., a start date, a due date, a completion date, and/or other project dates), a status and/or progress (e.g., an update, a hardcoded status update, a measured status, quantity of units of work remaining in a given project, completed units of work in a given project, and/or other status parameter), one or more attachments, notification settings, privacy, an associated URL, one or more interaction parameters (e.g., sources of the interactions, context of the interactions, content of the interactions, time for the interactions, and/or other interaction parameters), updates, ordering of units of work within the given project, state of a workspace for a given task within the given project, and/or other information.

Role information may be specified in work unit records and project records. individual roles of the individual users. The role information may specify roles of the users within the units of work and/or the projects. The roles may convey expected contribution of the users in completing and/or supporting the units of work and/or the projects. The individual roles of individual users within the units of work may be specified separately from the individual roles of the individual users within the projects. The project parameters may include a project role parameter characterizing the individual roles of the individual users with respect to individual projects. By way of non-limiting illustration, a first user may have a first role within a first unit of work and a second role within a first project. The first project may include the first unit of work and one or more other units of work.

A role may represent expected contribution of the users in completing and/or supporting the units of work and/or the projects. A role specified with respect to units of work and/or projects may be different from roles traditionally specified with respect to a business organization as a whole (e.g., President, CEO, intern, product designer, legal counsel, etc.). For example, an organization role may be "Product Designer"; a project role may be "Design Lead"; and a role on an individual unit of work may be "Approver."

A role within a unit of work may be specified based on one or more of a job title, a description of what the user should accomplish and/or plan on accomplishing for the given unit of work, and/or other specifications. By way of non-limiting illustration, a role within a unit of work may include one or more of general assignee, graphic designer, engineer, tester, writer, artist, mechanic, and/or other descriptions.

A role within a project may be specified based on a description of what the user may be supporting and/or plan on supporting for the given project, and/or other specifications. By way of non-limiting illustration, a role within a project may include one or more of owner, design, marketing, copy, legal, engineering, art director, and/or other descriptions. Although the specification of the role in a project may include the same or similar words as the role in a unit of work, the role in the project may enable and/or disable features within the collaboration environment otherwise not available to users of having roles in individual units of work but not at the project level. In some implementations, roles within a project may take on a more supervisory connotation than the roles within the individual units of work.

The objective information in objective records may include values of one or more objective parameters. The values of the objective parameters may be organized in objective records corresponding to business objectives managed, created, and/or owned within the collaboration environment. A given business objective may have one or more collaborators, and/or team members working on the given business objective. Business objectives may include one or more associated units of work and/or projects one or more users should accomplish and/or plan on accomplishing. Business objectives may be created by a given user for the given user and/or created by the given user and assigned to be owned to one or more other users. Individual business objectives may include one or more of an individual goal, an individual sub-goal, and/or other business objectives assigned to be owned by a user and/or associated with one or more users.

The business objectives may be associated with a set of units of work and/or projects that may indirectly facilitate progress toward fulfillment of the business objectives. The set of units of work and/or projects may not directly contribute to the progress. By way of non-limiting illustration, a connection between the set of units of work and/or projects and a corresponding business objective may be indirect in that completion of at least one of the units of work and/or projects may have no direct impact on progress toward fulfillment of the business objective. The concept of "no direct impact" may mean that completion of the at least one unit of work and/or project may not cause progress toward fulfillment of the business objective without independent action outside of the at least one unit of work and/or project. Instead, the fulfillment of the at least one unit of work and/or project may make such independent action more likely (e.g., through coercion, assistance, education, incentivization, reminder, etc.). However, in some implementations, business objectives may be associated with a set of units of work and/or projects that may directly facilitate progress toward fulfillment of the business objectives. Accordingly, completion of the set of units of work and/or projects may directly contribute to the progress toward fulfillment. Business objectives may be associated with an objectives and key result (OKR) goal-setting framework. Business objectives may be specified on one or more of a team basis, organization basis, and/or other specifications. In some implementations, business objectives may be characterized as user objectives. The user objectives may be associated with a set of units of work and/or projects that may indirectly (and/or directly) facilitate progress toward fulfillment of the user objectives. User objectives may be specified on an individual user basis.

Individual objective records may describe individual business objectives and identify sets of individual ones of the work unit records and/or project records that specify the units of work and/or projects as being associated with the individual business objectives.

Individual sets of objective records may be defined by an objective record hierarchy. An objective record hierarchy may convey individual positions of objective records (and their corresponding business objectives) in the objective record hierarchy. By way of non-limiting illustration, a position may specify one or more of an objective record being superior to one or more other objective records, an objective record being subordinate to one or more other objective records, and/or other information. As a result, individual objective records may be subordinate and/or superior to other individual objective records. For example, the objective records may further include a second objective record. The first objective record and the second objective record may be organized by a first objective record hierarchy specifying that the second objective record is subordinate to the first objective record.

An objective record may define a business objective comprising a progress towards fulfillment, and a subordinate objective record may define a business objective comprising a subordinate progress towards fulfillment to the subordinate business objective. An objective record hierarchy may define a relationship between objective records.

Individual objective records may include hierarchical information defining an objective record hierarchy of the individual objective records. The hierarchical information of an objective record may include one or more of information identifying other objective records associated in an objective record hierarchy the objective record belongs to, a specification of the position of the objective record in the hierarchy, other relationships placed on the objective record by virtue of its position, and/or other information.

In some implementations, as a consequence of the objective record hierarchies, the individual business objectives described in the individual objective records that are subordinate to the other individual objective records may be subordinate to the individual business objectives in the other individual objective records.

In some implementations, the one or more objective parameters may include one or more of an objective definition parameter, an objective owner parameter, an objective management parameter, an objective creation parameter, an objective progress parameter, and/or other parameters. The value of the objective definition parameter may describe the particular business objective. The values of the objective owner parameter may describe business objectives assigned to be owned by an individual user. The values of the objective management parameter may describe business objectives managed as collaborators by the individual users.

The values of the objective creation parameter may describe business objectives created by the individual users.

In some implementations, the business objectives may be described based on one or more of a business objective name, a business objective description, one or more business objective dates (e.g., a start date, a due date, and/or dates), one or more users associated with a business objective, progress information (e.g., an update, a hardcoded status update, a measured status, a progress indicator, quantity value remaining for a given business objective, completed work units in a given project, and/or other progress information), one or more interaction parameters, notification settings, privacy, an associated URL, one or more custom fields (e.g., priority, cost, stage, and/or other custom fields), and/or other information.

The values of the objective owner parameter describing business objectives owned by the individual users may be determined based on one or more interactions by one or more users with a collaboration environment. In some implementations, one or more users may create and/or assign ownership of one or more business objectives to themselves and/or another user. In some implementations, a user may be assigned to own a business objective and the user may effectuate a reassignment of ownership of the business objective from the user or one or more other users.

Environment state component 108 may be configured to update the environment state information based on the role information and/or other information. By way of non-limiting illustration, the work unit parameters include the work unit role parameter characterizing the individual roles of the individual users with respect to individual units of work. The project parameters may include the project role parameter characterizing the individual roles of the individual users with respect to individual projects. By way of non-limiting illustration, a first value of the work unit role parameter for the first unit of work may specify that the first user has the first role within the first unit of work, and a second value of the project role parameter for the first project specifies the first user as having the second role within the first project.

The user interface component 112 may be configured to effectuate presentation of user interfaces and/or other displays on individual client computing platforms of one or more client computing platforms 104. The user interface component 112 may be configured to effectuate presentation of the collaboration environment as a whole, individual work unit pages, individual project pages, and/or other content. The user interface component 112 may be configured to effectuate presentation of the collaboration environment based on the environment state information so that access, by the users, to the individual units of work and/or the individual projects reflects the roles of the users within the units of work and/or the projects.

In some implementations, presenting the collaboration environment to reflect the roles of the users within the units of work and/or the projects may comprise enabling and/or disabling use of sets of features. By way of non-limiting illustration, individual sets of features may be related to the individual units of work and/or the individual projects based on the roles of the users within the units of work and/or the projects. The individual sets of features related to the individual units of work may be specific to completing and/or supporting specific ones of the individual units of work. The individual sets of features related to the individual projects may be specific to supporting the individual projects. In some implementations, if one or more features are not enabled for a given user, those one or more features may be deemed disabled for the given user. For example, the features enabled for users having a project-level role may be specifically disabled for users having roles within units of work but not at the project level.

In some implementations, the individual sets of features specific to completing and/or supporting the individual units of work may be enabled within individual work unit pages providing access to the individual units of work. The individual work unit pages may comprise a user interface that provide access to and/or otherwise facilitate interaction with a given unit of work. The individual sets of features specific to completing and/or supporting the individual units of work may include one or more of specifying completion status of the individual units of work, communicating with other users linked within the individual units of work, generating meetings with the other users having other roles (e.g., subordinate or superior) within the individual units of work, accessing application programs outside of the collaboration environment, editing the individual units of work, and/or other features.

In some implementations, specifying completion status of the individual units of work may include the ability to change values of the work assignment parameter to indicate a unit of work has changed from "incomplete" to "marked complete" and/or "complete". In some implementations, specifying completion status of the individual units of work may include the ability to change values of the work assignment parameter to indicate a unit of work has changed from "complete" or "marked complete" to "incomplete".

In some implementations, communicating with other users linked within the individual units of work may include communicating within individual work unit pages (e.g., adding comments, messages, and/or other communications), communicating within the collaboration environment (e.g., messaging system not tied to a given unit of work), communicating outside of the collaboration environment (e.g., email, SMS, etc.), and/or other considerations. In some implementations, the other users linked within a unit of work may include other users having specific roles within the unit of work.

In some implementations, generating meetings with other users having other roles within the individual units of work may include sending invites to the other users. Sending invites may include selecting meeting participants, proposed date/time for the meeting, setting agenda topics, and/or other functionality. In some implementations, generating meetings with other users may be limited to other users of certain roles within the individual units of work. In some implementations, this may include only generating meetings with users having one or more of a subordinate role, a superior role, a similar role, and/or other types of users. By way of non-limiting illustration, users of a given role within a unit of work may be allowed to generate meetings with their subordinates within the context of the unit of work. Meeting generation may be facilitated by functionality that is integral to the collaboration environment and/or provided through access to an external resource (e.g., third party meeting generation applications).

In some implementations, editing the individual units of work may include one or more of adding, removing, changing, updating, and/or otherwise interacting directly with values of one or more work unit parameters of the individual units of work.

In some implementations, the individual sets of features specific to completing and/or supporting the individual projects may be enabled within individual project pages providing access to the individual projects. The individual sets of features specific to supporting the individual projects may include one or more of communicating with the other users having other roles within the individual projects, communicating with the other users linked to the units of work within the individual projects, generating meetings with the other users having the other roles within the individual projects, generating meetings with the other users linked to the units of work within the individual projects, editing the individual projects, editing the units of work within the individual projects, setting privileges for users having roles within individual units of work that make up the individual projects, and/or other features.

In some implementations, communicating with the other users having other roles within the individual projects may include communicating within individual project pages (e.g., adding comments, messages, and/or other communications), communicating within the collaboration environment (e.g., messaging system not tied to a given project), communicating outside of the collaboration environment (e.g., email, SMS, etc.), and/or other considerations. In some implementations, the other users having other roles within a project may include other users having specific roles within the project. The specific roles may be roles considered subordinate to a given user's role, or superior to the given user's role.

In some implementations, communicating with the other users linked to the units of work within the individual projects may include communicating within individual work unit pages (e.g., adding comments, messages, and/or other communications), communicating within the collaboration environment (e.g., messaging system not tied to a given unit of work), communicating outside of the collaboration environment (e.g., email, SMS, etc.), and/or other considerations. In some implementations, the other users linked within a unit of work may include other users having specific roles within the unit of work.

In some implementations, generating meetings with the other users having the other roles within the individual projects may include sending invites to the other users. Sending invites may include selecting meeting participants, proposed date/time for the meeting, setting agenda topics, and/or other functionality. In some implementations, generating meetings with other users may be limited to other users of certain roles within the individual projects. In some implementations, this may include only generating meetings with users having one or more of a subordinate role within the project, a superior role within the project, a similar role within the project, and/or other types of users. By way of non-limiting illustration, users of a given role within a project may be allowed to generate meetings with other users having other roles within the project but not users who have roles within the units of work but not at the project level.

In some implementations, generating meetings with the other users linked to the units of work within the individual projects may include sending invites to the other users. Sending invites may include selecting meeting participants, proposed date/time for the meeting, setting agenda topics, and/or other functionality. In some implementations, generating meetings with other users may be limited to other users having some linking to one or more of the units of work that make up the project.

In some implementations, editing the individual projects may include one or more of adding, removing, changing, updating, and/or otherwise interacting directly with values of one or more project parameters of the individual projects.

In some implementations, editing the units of work within the individual projects may include one or more of adding, removing, changing, updating, and/or otherwise interacting directly with values of one or more work unit parameters of the individual units of work within the project.

User interface component 112 may be configured to provide access to (e.g., enable) and/or restrict access to (e.g., disable) features for the users based on their roles. User interface component 112 configured to determine whether or not the users have a certain role by querying environment state component 108. In some implementations, responsive to a user having given role in a unit of work and/or project, they may be deemed to have access to, or to be restricted from, one or more features.

By way of non-limiting illustration, a first set of features related to the first unit of work may be enabled for the first user by virtue of having the first role within the first unit of work. The first set of features may be specific to completing and/or supporting the first unit of work. Use of a second set of features related to the first project may be enabled for the first user by virtue of having the second role within the first project. The second set of features may be specific to supporting the first project. By way of non-limiting illustration, the second set of features may facilitate supporting the first unit of work and/or the one or more other units of work in the first project.

In some implementations, the sets of features being enabled and/or disabled may be specific to the roles of the users within the units of work and the projects. By way of non-limiting illustration, use of a third set of features related to the first unit of work may be enabled for a second user by virtue of having the third role within the first unit of work. The third set of features may be different from the first set of features. By way of non-limiting illustration, use of a fourth set of features related to the first project may be enabled for the third user by virtue of having the fourth role within the first project. The fourth set of features may be different from the second set of features.

In some implementations, the environment state component 108 may be configured to define the individual projects based on user records of users assigned particular roles in the individual projects. By way of non-limiting illustration, if an individual projects includes a user of a given role, the project may reflect the preferences of the user. In some implementations, the given role may be "owner" and/or other role. This may be a way to preconfigure a project effectively and automatically at the onset based on the particular user who owns the project and/or otherwise maintains the most control over the project.

User interface component 112 may be configured to obtain user records for the users of a given role within the individual projects. The user records may include preference information specifying project preferences of the users of the given role. The user interface component 112 may be configured to define the individual projects including the users of the given role based on the user records. By way of non-limiting illustration, the individual projects including the users of the given role may reflect the project preferences of the users of the given role at the onset of the individual project. This may provide an automated way to set certain project parameters at the onset to align with certain user's preferences. By way of non-limiting illustration, one or more of a quantity of the units of work within a project may be set, an arrangement of the units of work within a project may be set, dependency of individual ones of the units of work within a project may be set, assignment of the individual users to the units of work within a project may be set, the roles of the individual users assigned to the units of work within a project may be set, and/or other project parameters may be set based on project preferences of a user having a given role at the project level.

In some implementations, environment state information may be updated as users continue to interact with the collaboration environment via the user interfaces over time. The environment state component 108 may store and/or archive the environment state information periodically and/or based on user request to archive. In some implementations, the environment state component 108 may store historical environment state information specifying historical user information, historical work information, historical project information, historical objective information, user interaction history, historical role information, and/or other information.

In some implementations, user interface component 112 may be configured to obtain input information and/or other information. The input information may convey user input into a user interface presented on the client computing platform(s) 104. A set of user interface elements may be provided on the user interface to facilitate the user input and/or other user interaction with the user interface. The user interface elements may include one or more of text input fields, drop down menus, check boxes, display windows, virtual buttons, and/or other elements configured to facilitate user interaction. The user input may include roles of users within individual units of work and/or projects.

Figure 3:
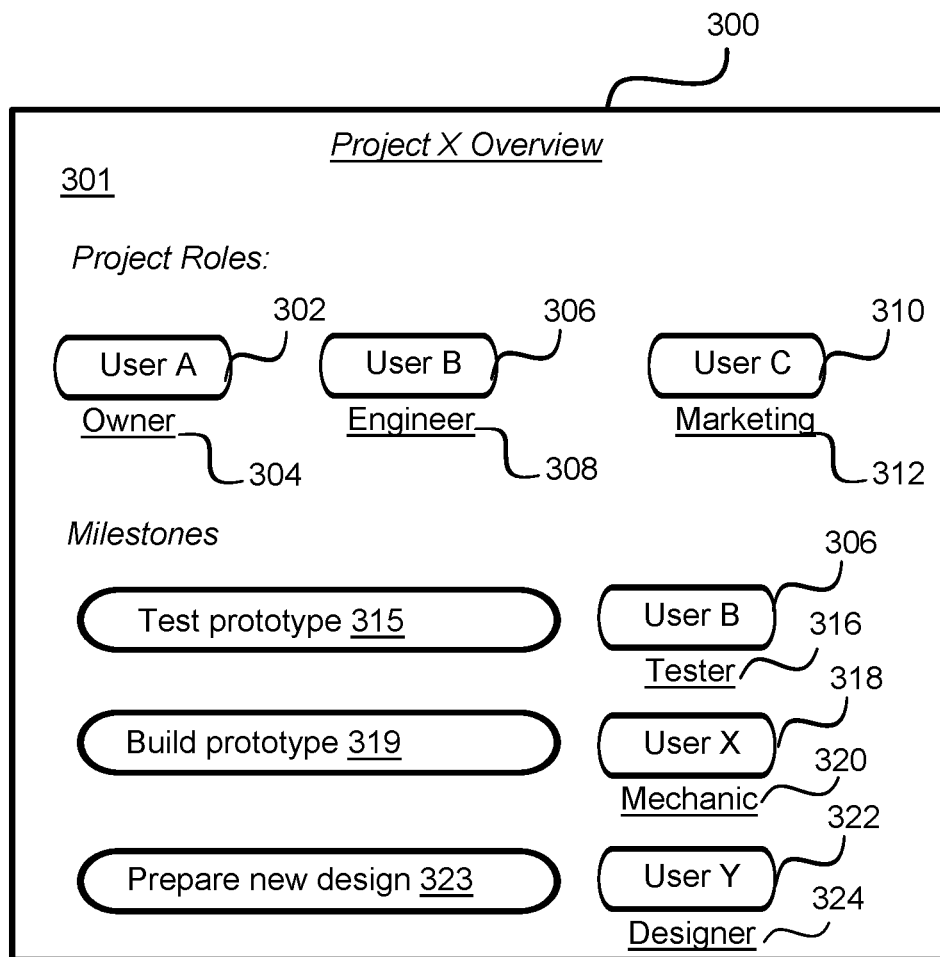
FIG. 3 illustrates a user interface, in accordance with one or more implementations.

FIG. 3 illustrates a user interface 300, in accordance with one or more implementations. The user interface 300 may display a project overview graphical user interface 301 for a project, referred to as "Project X." The project overview graphical user interface 301 for Project X may include a set of interface elements displaying the values of one or more of the project parameters of Project X and/or values of one or more of the work unit parameters of the units of work making up Project X. The user interface elements may convey information including one or more of one or more users having one or more roles at the project level, one or more units of work that make up the project, one or more users having one or more roles in the one or more units of work that make up the project, and/or other information. By way of non-limiting illustration, a first user interface element 302 may indicate that a first user (e.g., User A) has a first role 304 (e.g., owner) within Project X; a second user interface element 306 may indicate that a second user (e.g., User B) has a second role 308 (e.g., engineer) within Project X; and/or a third user interface element 310 may indicate that a third user (e.g., User C) has a third role 312 (e.g., marketing) within Project X. Individual ones of the first user, second user, and/or third user may be granted certain access privileges to Project X and/or one or more units of work that make up Project X that reflects their roles in Project X.

The one or more units of work that may make up Project X may include a first unit of work represented by a fourth user interface element 315, a second unit of work represented by a fifth user interface element 319, and/or a third unit of work represented by a sixth user interface element 323. The second user interface element 306 may indicate that the second user (e.g., User B) has a fourth role 316 (e.g., tester) within the first unit of work; a seventh user interface element 318 may indicate that a fourth user (e.g., User X) has a fifth role 320 (e.g., mechanic) within the second unit of work; and/or an eighth user interface element 322 may indicate that a fifth user (e.g., User Y) has a sixth role 324 (e.g., designer) within the third unit of work. Individual ones of the second user, fourth user, and/or fifth user may be granted certain access privileges to individual units of work that reflects their roles in the individual units of work.

Referring back to FIG. 1, in some implementations, server(s) 102, client computing platform(s) 104, and/or external resources 126 may be operatively linked via one or more electronic communication links. For example, such electronic communication links may be established, at least in part, via a network 116 such as the Internet and/or other networks. It will be appreciated that this is not intended to be limiting, and that the scope of this disclosure includes implementations in which server(s) 102, client computing platform(s) 104, and/or external resources 126 may be operatively linked via some other communication media.

A given client computing platform may include one or more processors configured to execute computer program components. The computer program components may be configured to enable an expert or user associated with the given client computing platform to interface with system 100 and/or external resources 126, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 126 may include sources of information outside of system 100, external entities participating with system 100, and/or other resources. In some implementations, some or all of the functionality attributed herein to external resources 126 may be provided by resources included in system 100.

Server(s) 102 may include electronic storage 128, one or more processors 130, and/or other components. Server(s) 102 may include communication lines, or ports to enable the exchange of information with a network 116 and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, a physical processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, 112, and/or other components. Processor(s) 130 may be configured to execute components 108, 110, and/or 112, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, and/or 112 are illustrated in FIG. 1 as being implemented within a single processing unit, in implementations in which processor(s) 130 includes multiple processing units, one or more of components 108, 110, and/or 112 may be implemented remotely from the other components. The description of the functionality provided by the different components 108, 110, and/or 112 described below is for illustrative purposes, and is not intended to be limiting, as any of components 108, 110, and/or 112 may provide more or less functionality than is described. For example, one or more of components 108, 110, and/or 112 may be eliminated, and some or all of its functionality may be provided by other ones of components 108, 110, and/or 112. As another example, processor(s) 130 may be configured to execute one or more additional components that may perform some or all of the functionality attributed below to one of components 108, 110, and/or 112.

Figure 2:
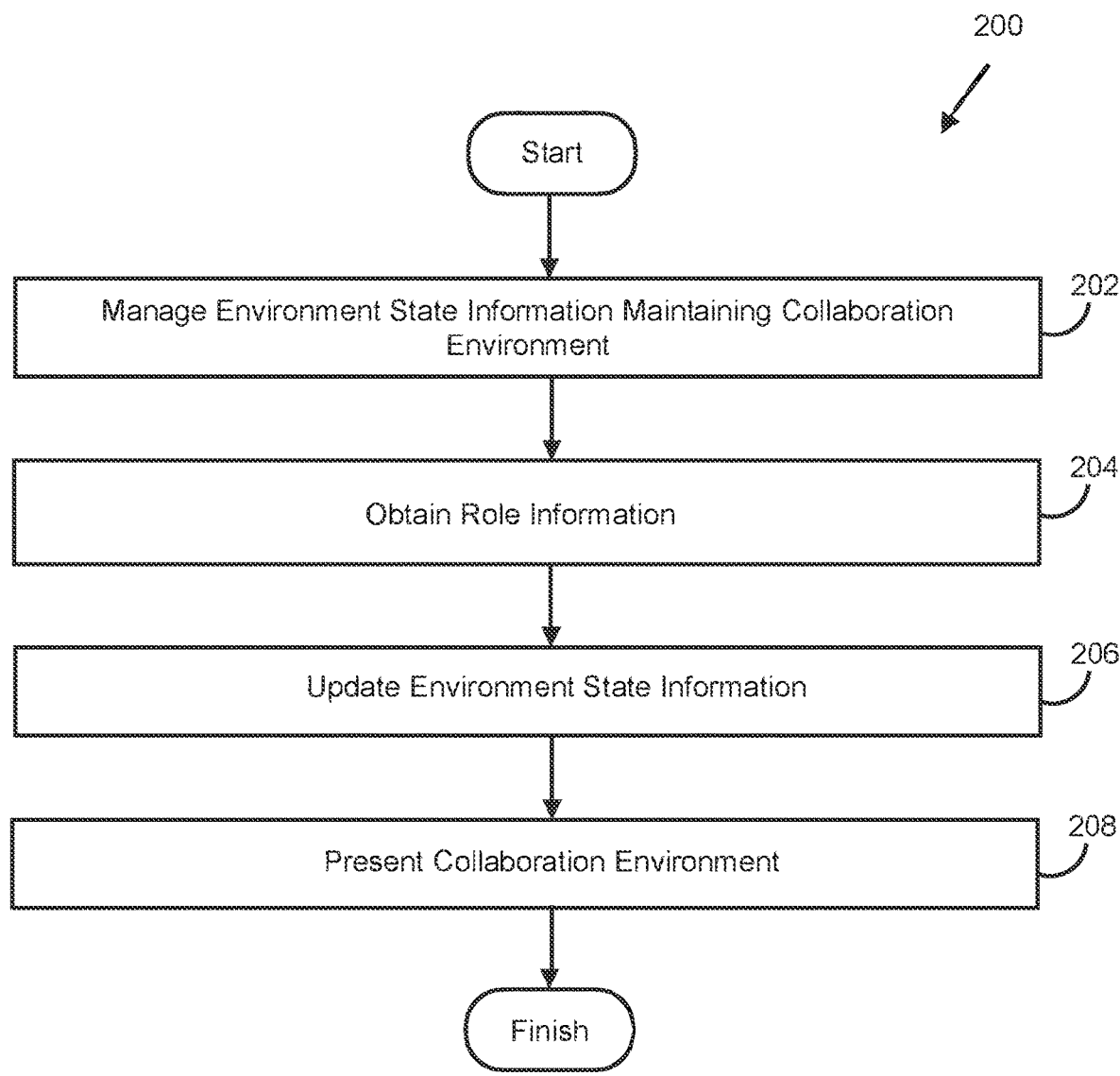
FIG. 2 illustrates a method to facilitate interaction with a collaboration environment based on assignment of project-level roles, in accordance with one or more implementations.

FIG. 2 illustrates a method 200 to facilitate interaction with a collaboration environment based on assignment of project-level roles, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may manage environment state information maintaining a collaboration environment, and/or other information. The collaboration environment may be configured to facilitate interaction by users with the collaboration environment. The environment state information may include one or more of work unit records, project records, and/or other records. The work unit records may include values for work unit parameters associated with units of work managed, created, and/or assigned within the collaboration environment. The project records may include values for project parameters associated with projects managed within the collaboration environment. An individual project may include an individual set of the units of work. Operation 202 may be performed by one or more hardware processors configured by machine-readable instructions including a component that is the same as or similar to environment state component 108 (shown in FIG. 1 and described herein), in accordance with one or more implementations.

An operation 204 may obtain role information specifying roles of the users within the units of work and the projects. The roles may convey expected contribution of the users in completing and/or supporting the units of work and the projects. The individual roles of individual users within the units of work may be specified separately from the individual roles of the individual users within the projects. By way of non-limiting illustration, a first user may have a first role within a first unit of work and a second role within a first project. The first project may include the first unit of work and one or more other units of work. Operation 204 may be performed by one or more hardware processors configured by machine-readable instructions including a component that is the same as or similar to role management component 110 (shown in FIG. 1 and described herein), in accordance with one or more implementations.

An operation 206 may update the environment state information based on the role information and/or other information. The work unit parameters may include a work unit role parameter characterizing the individual roles of the individual users with respect to individual units of work. The project parameters may include a project role parameter characterizing the individual roles of the individual users with respect to individual projects. By way of non-limiting illustration, a first value of the work unit role parameter for the first unit of work may specify that the first user has the first role within the first unit of work, and a second value of the project role parameter for the first project may specify that the first user has the second role within the first project. Operation 206 may be performed by one or more hardware processors configured by machine-readable instructions including a component that is the same as or similar to environment state component 108 (shown in FIG. 1 and described herein), in accordance with one or more implementations.

An operation 208 may effectuate presentation of the collaboration environment based on the environment state information so that access, by the users, to the individual units of work and the individual projects reflects the roles of the users within the units of work and the projects. Operation 208 may be performed by one or more hardware processors configured by machine-readable instructions including a component that is the same as or similar to user interface component 112 (shown in FIG. 1 and described herein), in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to facilitate interaction with a collaboration environment based on assignment of roles, the system comprising:

one or more physical processors configured by machine-readable instructions to:

manage, by a server, environment state information maintaining a collaboration environment, the collaboration environment being configured to facilitate interaction by a first user with the collaboration environment, wherein the first user interacts with the collaboration environment via a first remotely located client computing platform communicating with the server over one or more Internet connections, the environment state information including a first project record for a first project, the first project being associated with a first unit of work and one or more other units of work;

obtain, by the server, role information specifying roles of the first user, the role information specifying the first user has a first role within the first unit of work and concurrently has a second role within the first project;

generate, by the server, information defining a user interface of the collaboration environment; and effectuate communication of the information defining the user interface of the collaboration environment to the first remotely located client computing platform over the one or more Internet connections to cause the first remotely located client computing platform to present the user interface so that the first user's ability to interact with a work unit record of the first unit of work and the first project record of the first project is made dependent on the roles of the first user, such that use of a first set of features related to interacting with the first work unit record is enabled for the first user by virtue of having the first role within the first unit of work, and use of a second set of features related to interacting with the first project record is enabled for the first user by virtue of having the second role within the first project.

2. The system of claim 1, wherein one or more features in the first set of features are specific to completing and/or supporting the first unit of work, and one or more features in the second set of features are specific to supporting the first project.

3. The system of claim 2, wherein the first set of features are enabled within a first work unit page providing access to the first work unit record.

4. The system of claim 3, wherein the first set of features includes one or more of specifying completion status, communicating with other users, or generating meeting requests.

5. The system of claim 2, wherein the second set of features are enabled within a project page providing access to the first project record.

6. The system of claim 5, wherein the second set of features include one or more of communicating with other users via the project page, generating meetings requests via the project page, or editing the project page.

7. The system of claim 6, wherein the second set of features include editing the project page.

8. The system of claim 1, wherein:

use of a third set of features related to interacting with the first work unit record is enabled for a second user by virtue of the second user having a third role within the first unit of work, the third set of features being different from the first set of features; and use of a fourth set of features related to interacting with the first project record is enabled for the third user by virtue of the third user concurrently having a fourth role within the first project, the fourth set of features being different from the second set of features.

9. The system of claim 1, wherein the one or more physical processors are further configured by the machine-readable instructions to obtain a first user record for the first user.

10. The system of claim 9, wherein the first user record includes preferences of the first user.

11. A method to facilitate interaction with a collaboration environment based on assignment of project-level roles, the method comprising:

managing, by a server, environment state information maintaining a collaboration environment, the collaboration environment being configured to facilitate interaction by a first user with the collaboration environment, wherein the first user interacts with the collaboration environment via a first remotely located client computing platform communicating with the server over one or more Internet connections, the environment state information including a first project record for a first project, the first project being associated with a first unit of work and one or more other units of work;

obtaining, by the server, role information specifying roles of the first user, the role information specifying the first user has a first role within the first unit of work and concurrently has a second role within the first project;

generating, by the server, information defining a user interface of the collaboration environment; and effectuating communication of the information defining the user interface of the collaboration environment to the first remotely located client computing platform over the one or more Internet connections to cause the first remotely located client computing platform to present the user interface so that the first user's ability to interact with a work unit record of the first unit of work and the first project record of the first project is made dependent on the roles of the first user, including enabling use of a first set of features related to interacting with the first work unit record for the first user by virtue of having the first role within the first unit of work, and enabling use of a second set of features related to interacting with the first project record for the first user by virtue of having the second role within the first project.

12. The method of claim 11, wherein one or more features in the first set of features are specific to completing and/or supporting the first unit of work, and one or more features in the second set of features are specific to supporting the first project.

13. The method of claim 12, wherein the first set of features are enabled within a first work unit page providing access to the first work unit record.

14. The method of claim 13, wherein the first set of features includes one or more of specifying completion status, communicating with other users, or generating meeting requests.

15. The method of claim 12, wherein the second set of features are enabled within a project page providing access to the first project record.

16. The method of claim 15, wherein the second set of features include one or more of communicating with other users via the project page, generating meetings requests via the project page, or editing the project page.

17. The method of claim 16, wherein the second set of features include editing the project page.

18. The method of claim 11, further comprising:
enabling use of a third set of features related to interacting with the first work unit record for a second user by virtue of the second user having a third role within the first unit of work, the third set of features being different from the first set of features; and
enabling use of a fourth set of features related to interacting with the first project record for the third user by virtue of the third user concurrently having a fourth role within the first project, the fourth set of features being different from the second set of features.

19. The method of claim 11, wherein further comprising obtaining a first user record for the first user.

20. The method of claim 19, wherein the first user record includes preferences of the first user.

* * * * *